US009173089B2

(12) United States Patent
Sridharan et al.

(10) Patent No.: US 9,173,089 B2
(45) Date of Patent: Oct. 27, 2015

(54) ALLOCATION OF DEVICE ID IN DEVICE TO DEVICE COMMUNICATIONS

(71) Applicant: Samsung Electronics Co., Ltd., Suwon-si, Gyeonggi-do (KR)

(72) Inventors: Sriram Sridharan, Dallas, TX (US); Young-Han Nam, Plano, TX (US); Thomas David Novlan, Dallas, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 104 days.

(21) Appl. No.: 14/149,583

(22) Filed: Jan. 7, 2014

(65) Prior Publication Data
US 2014/0192735 A1 Jul. 10, 2014

Related U.S. Application Data

(60) Provisional application No. 61/751,144, filed on Jan. 10, 2013.

(51) Int. Cl.
*G01R 31/08* (2006.01)
*H04W 8/26* (2009.01)
*H04L 29/12* (2006.01)
*H04W 76/02* (2009.01)
*H04W 8/00* (2009.01)

(52) U.S. Cl.
CPC .............. *H04W 8/26* (2013.01); *H04L 61/2038* (2013.01); *H04L 61/6004* (2013.01); *H04W 8/005* (2013.01); *H04W 76/023* (2013.01)

(58) Field of Classification Search
None
See application file for complete search history.

(56) References Cited

U.S. PATENT DOCUMENTS 8,126,488 B2\* 2/2012 Albert et al. .................. 455/502
2009/0213829 A1 8/2009 Malkamaki et al.
(Continued)

FOREIGN PATENT DOCUMENTS

| KR | 20120074254 A | 7/2012 |
| WO | WO 2011/042417 A2 | 4/2011 |
| WO | WO 2011/136620 A2 | 11/2011 |

OTHER PUBLICATIONS

International Search Report dated Apr. 25, 2014 in connection with International Patent Application No. PCT/KR2014/000316, 3 pages.

(Continued)

*Primary Examiner* — Duc C Ho

(57) ABSTRACT

A method of assigning a device ID of a device-to-device network to a mobile station includes: selecting a subset from a set of parameters from which the device ID is determined, each parameter in the set having a number of bits for complete representation, the subset comprising a number $N_{d2d}$ of parameters used to determine the device ID; determining a number L of device ID bits to represent the device ID; dividing the L device ID bits into a group of $l_1$ indicator bits and a group of $l_2$ identifier bits, wherein $l_2$ is the difference between the number L of device ID bits and the number $l_1$ of bits allocated to the group of indicator bits; assigning bit values to the $l_1$ indicator bits; allocating a number $L_j^p$ of the $l_2$ identifier bits to each of the parameters in the subset; and assigning bit values the $l_2$ identifier bits.

24 Claims, 15 Drawing Sheets

(56) References Cited

U.S. PATENT DOCUMENTS

| | | |
|---|---|---|
| 2010/0037045 A1 | 2/2010 | Schneyer et al. |
| 2014/0010099 A1* | 1/2014 | Chiu et al. .................... 370/252 |
| 2014/0010172 A1* | 1/2014 | Wei et al. ...................... 370/329 |
| 2014/0056220 A1* | 2/2014 | Poitau et al. .................. 370/328 |
| 2014/0355483 A1* | 12/2014 | Jang et al. ..................... 370/254 |

OTHER PUBLICATIONS

Written Opinion of International Searching Authority dated Apr. 25, 2014 in connection with International Patent Application No. PCT/KR2014/000316, 4 pages.

* cited by examiner

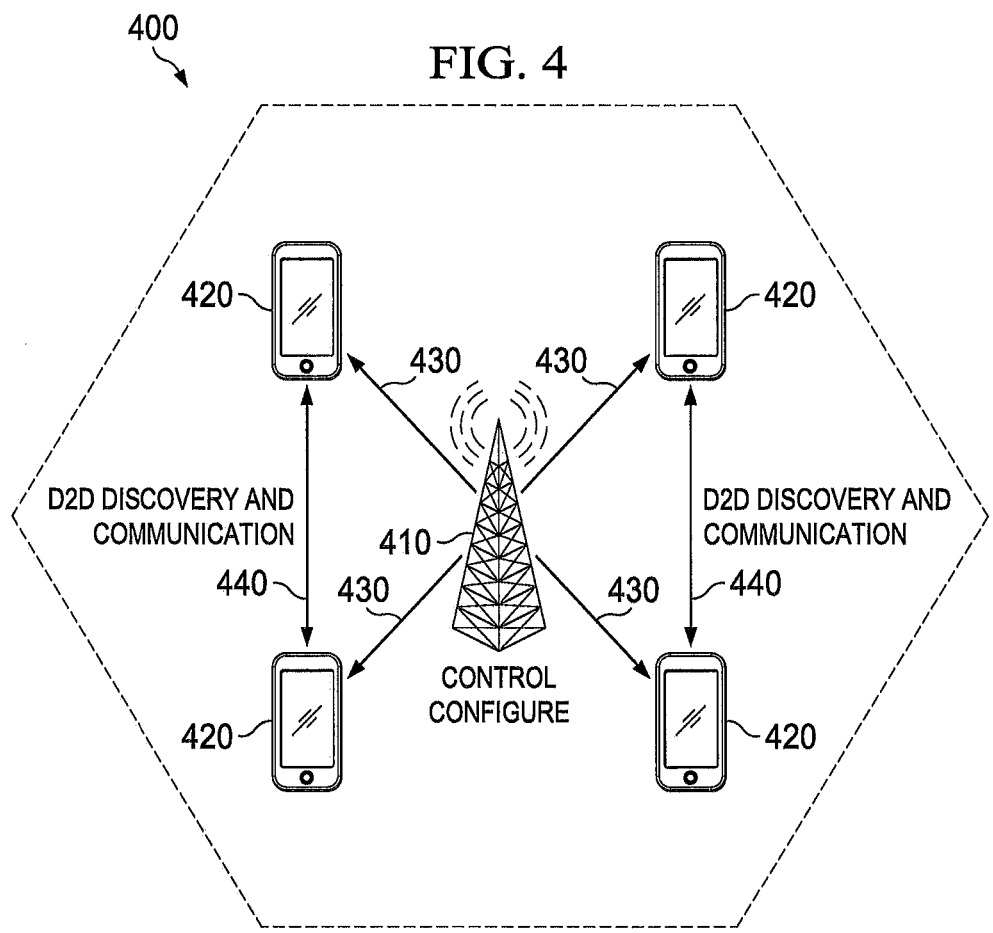
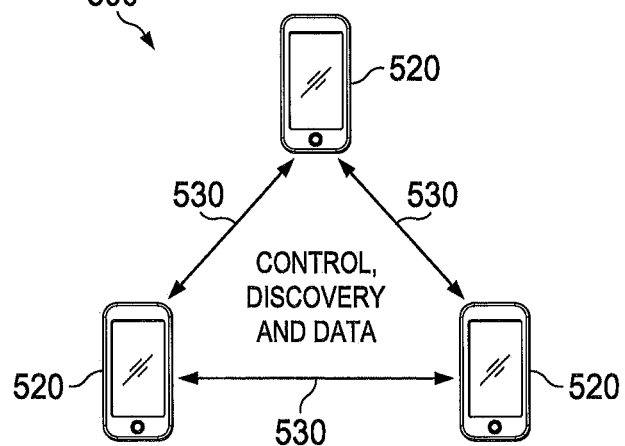

FIG. 6
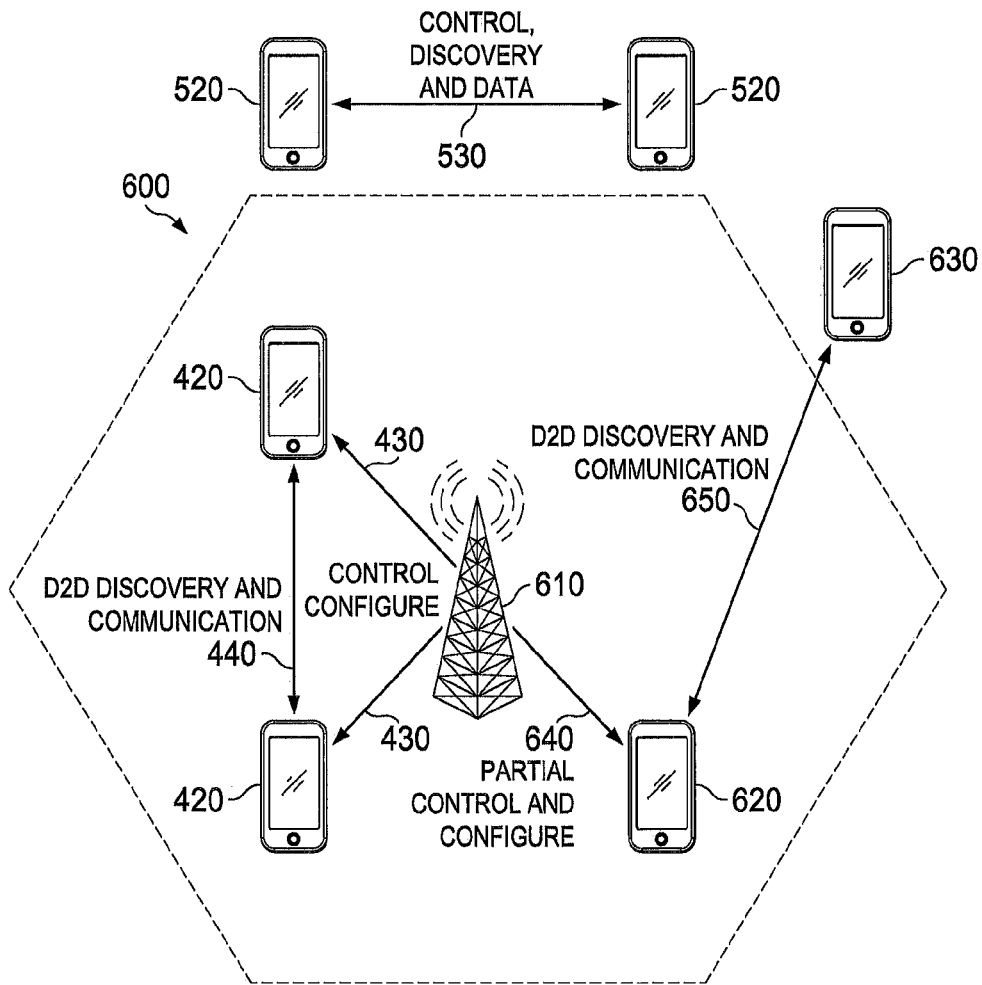
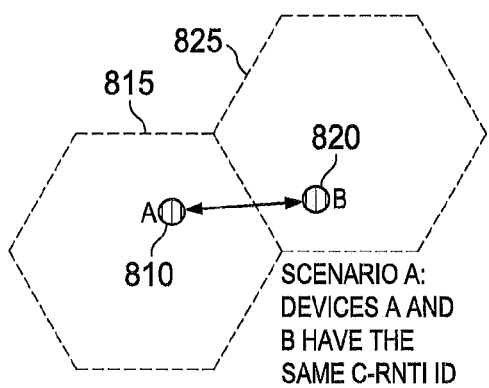
FIG. 8A
SCENARIO A: DEVICES A AND B HAVE THE SAME C-RNTI ID
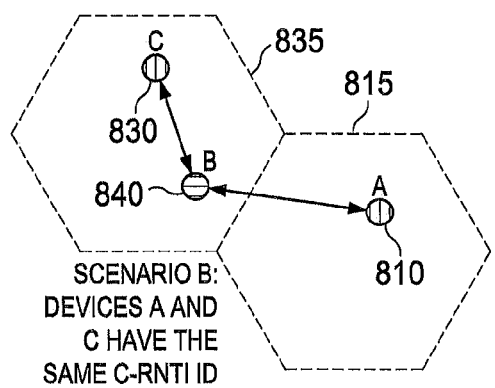
FIG. 8B
SCENARIO B: DEVICES A AND C HAVE THE SAME C-RNTI ID

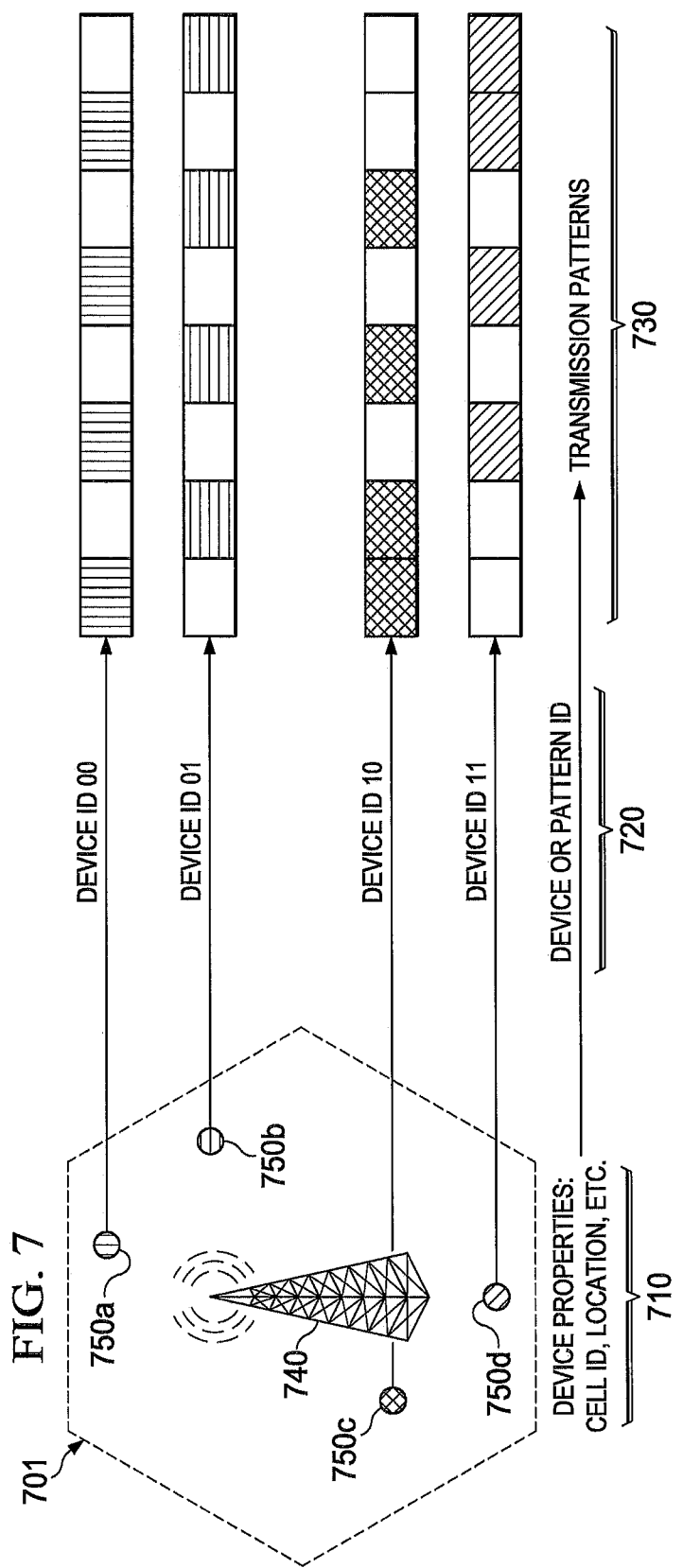

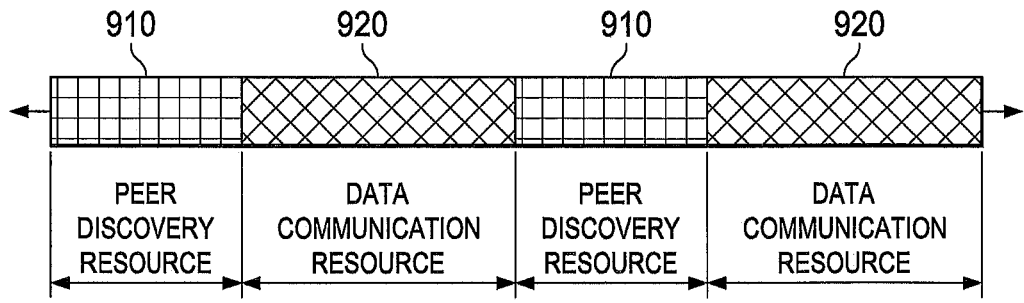
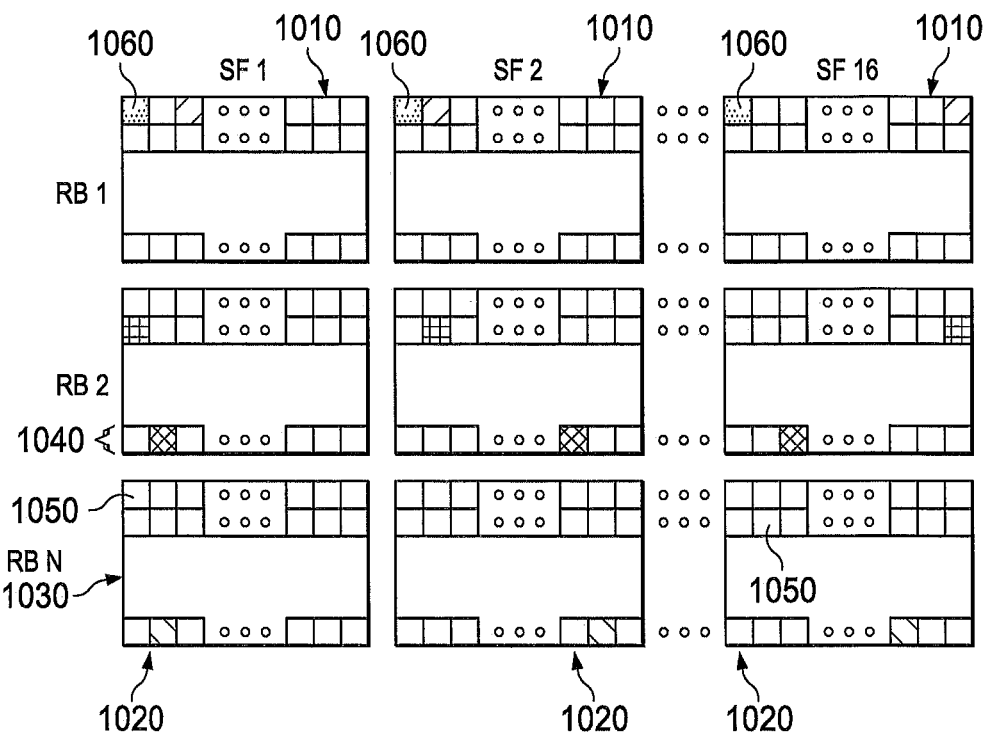

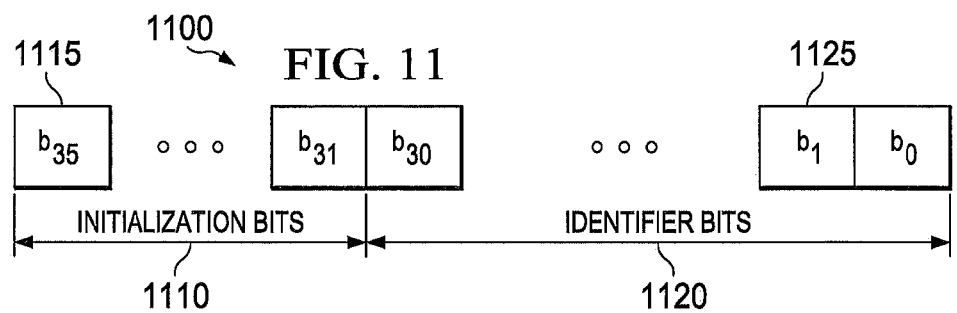
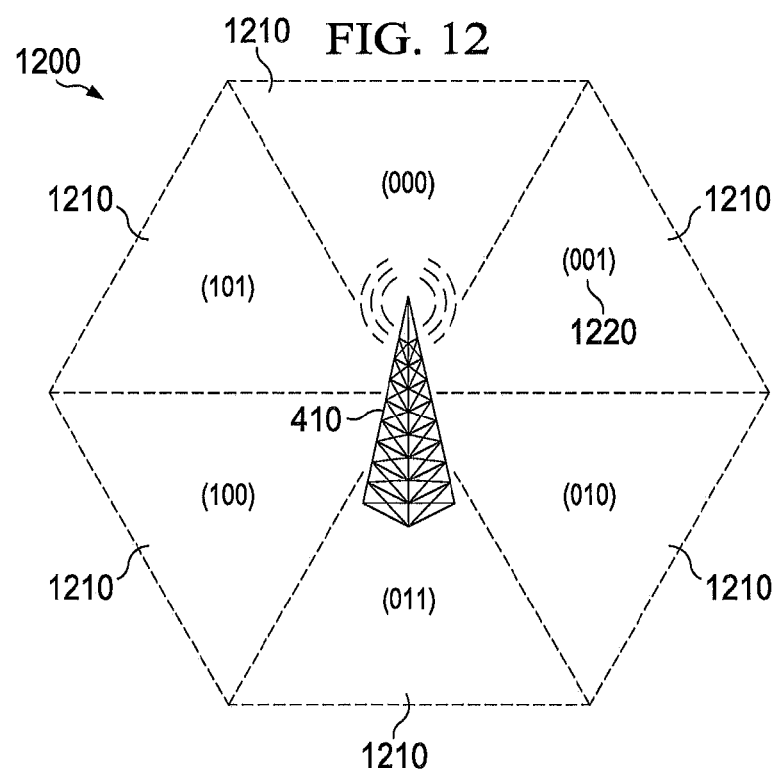

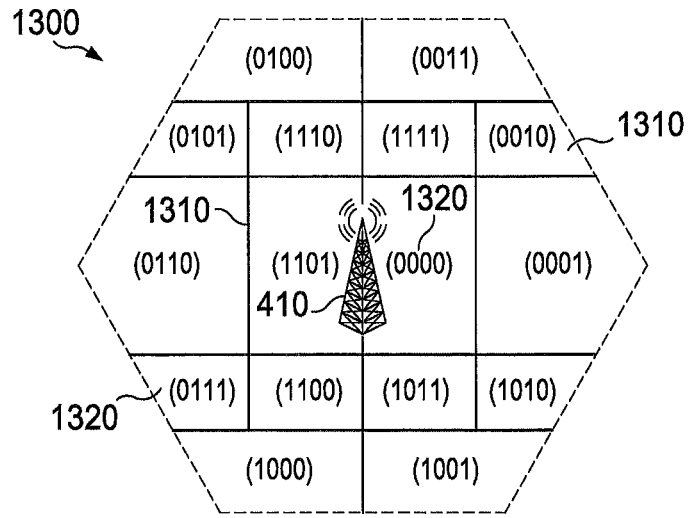

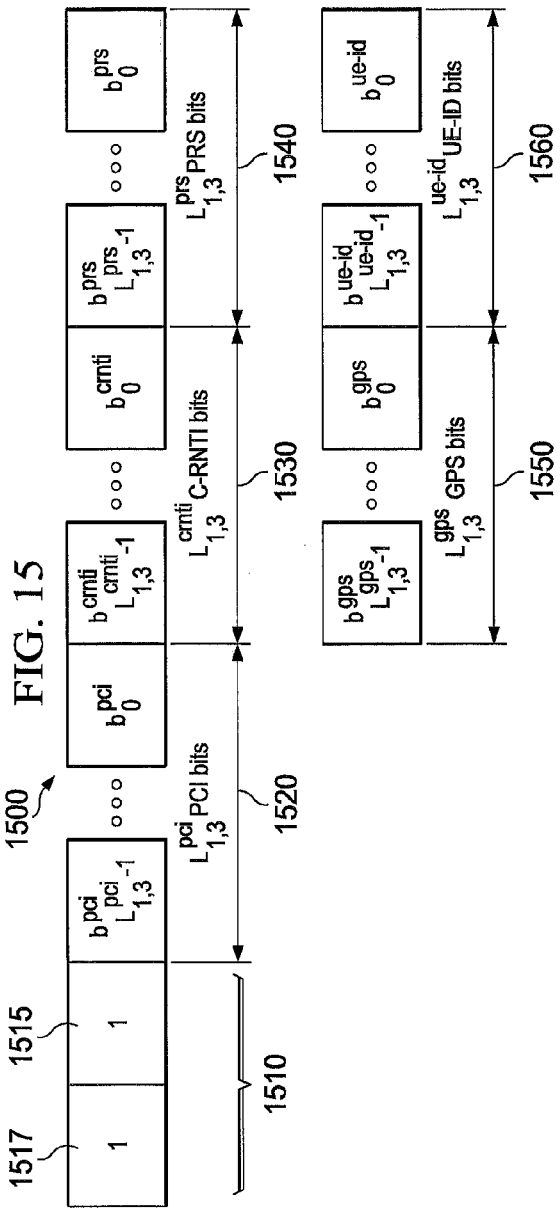
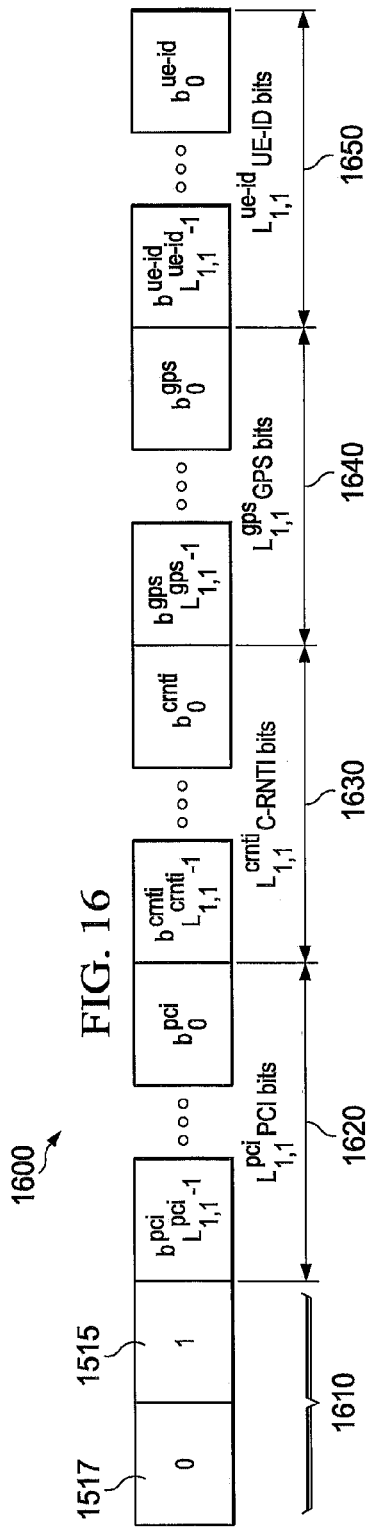
FIG. 15
FIG. 16

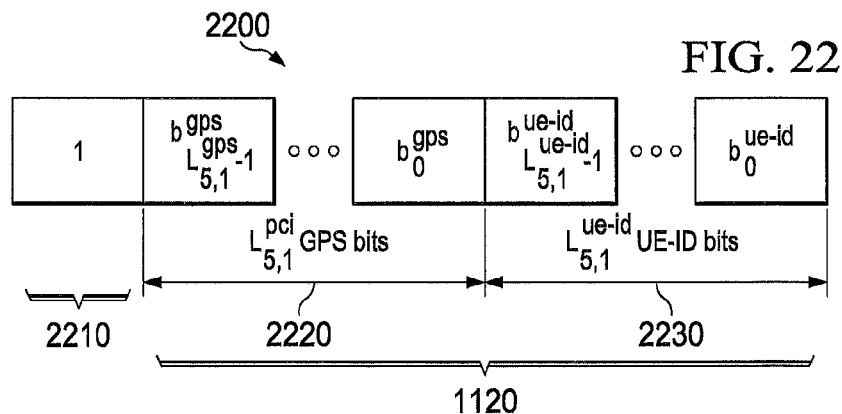
FIG. 22
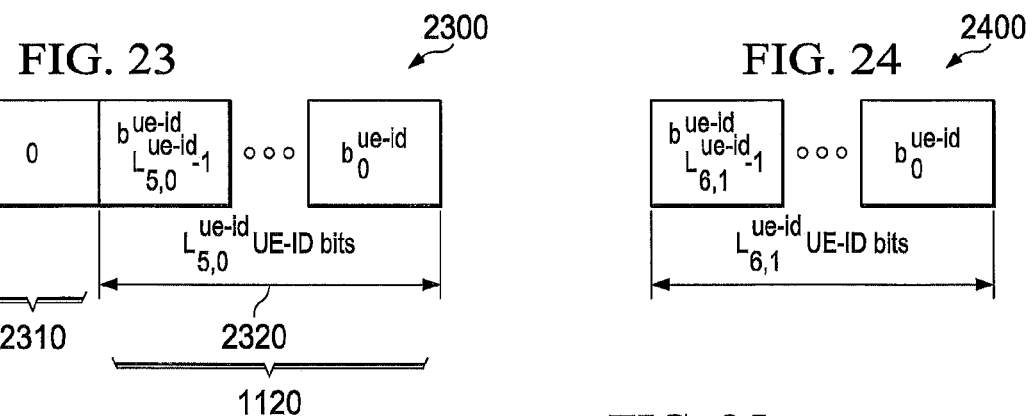
FIG. 23
FIG. 24
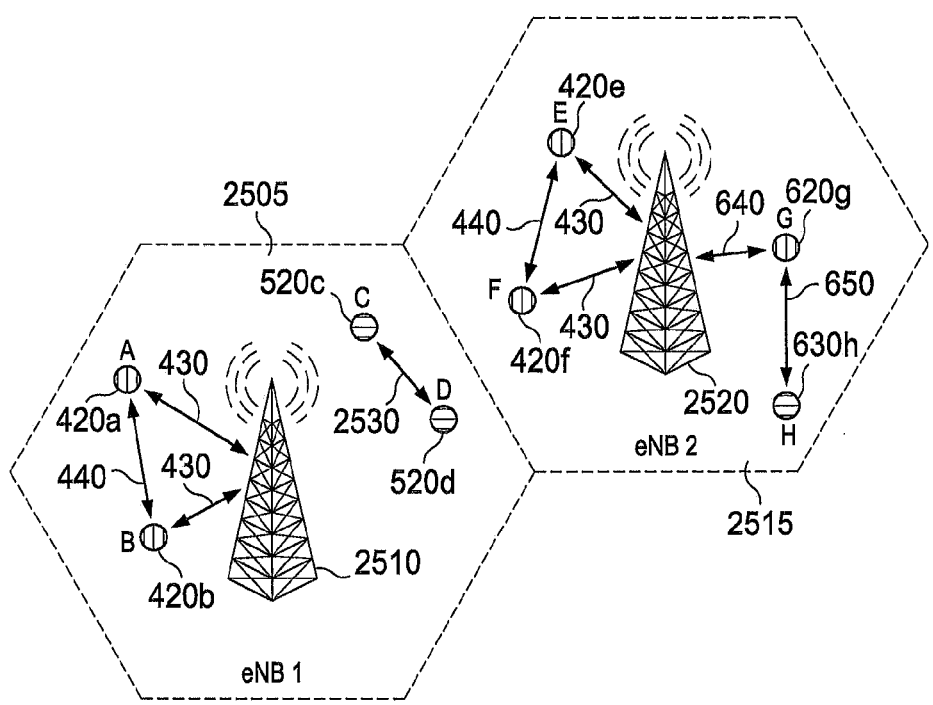
FIG. 25

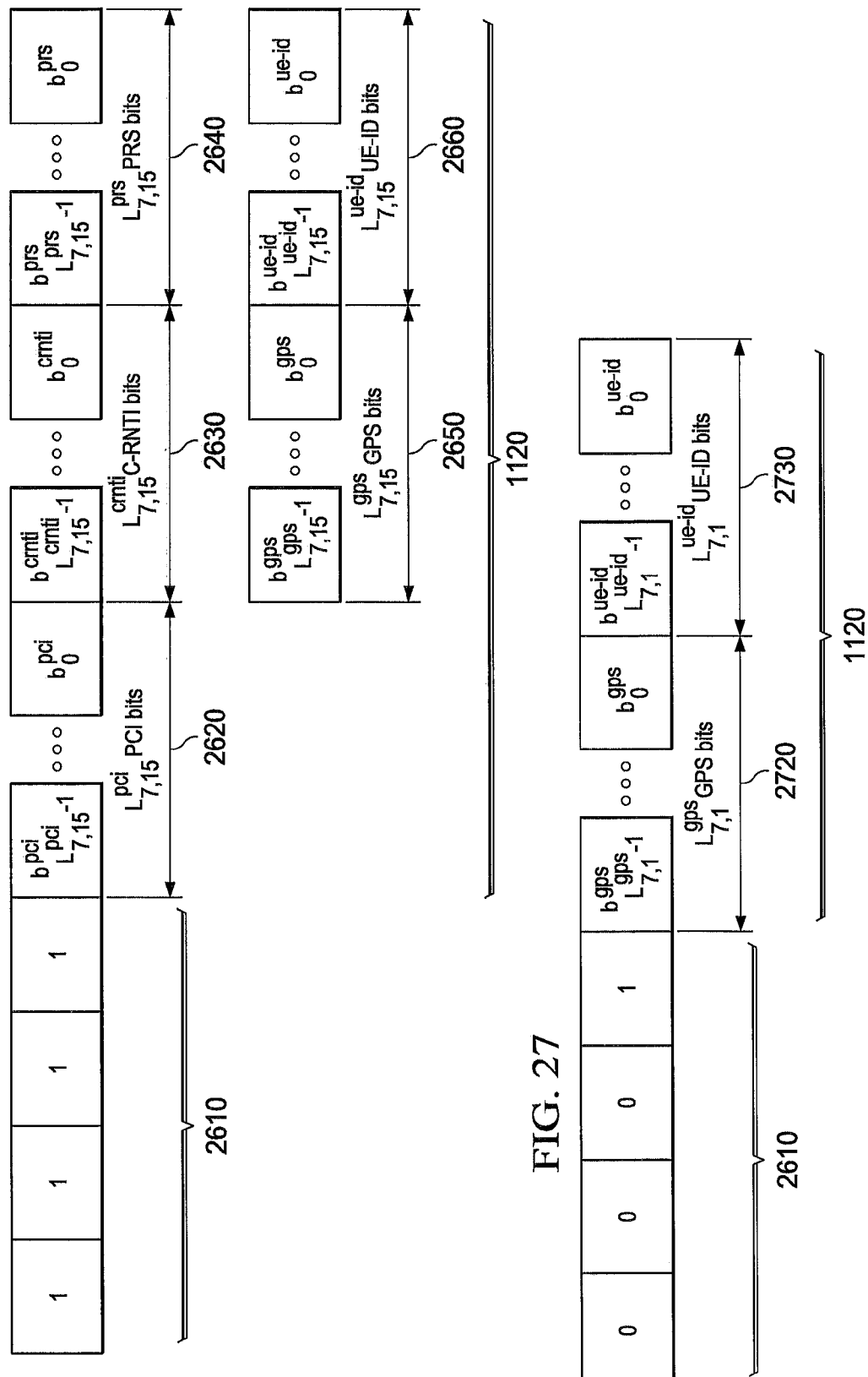

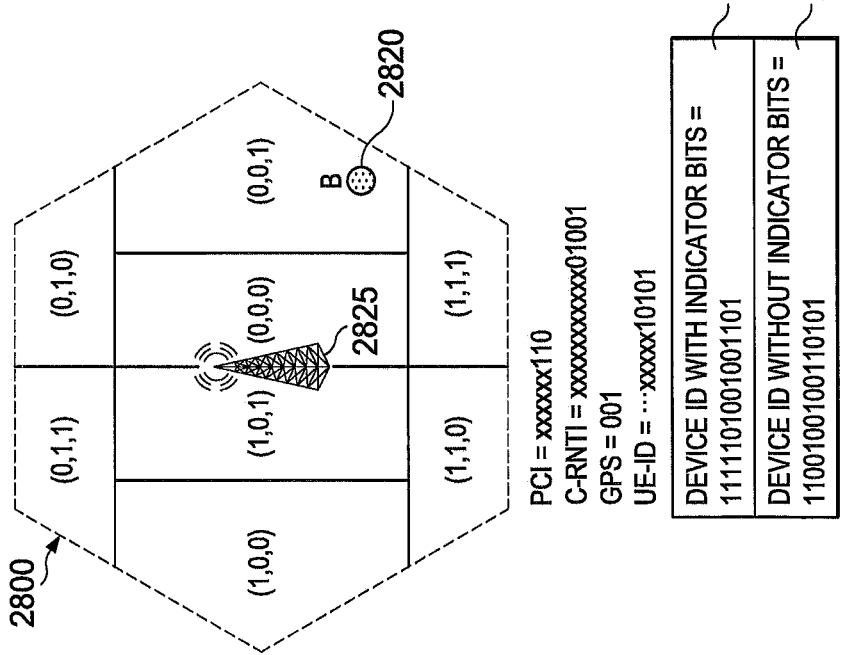
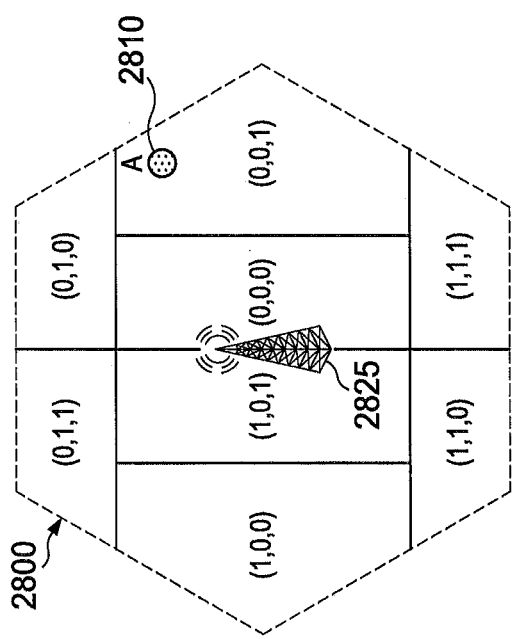
FIG. 28

ALLOCATION OF DEVICE ID IN DEVICE TO DEVICE COMMUNICATIONS

CROSS-REFERENCE TO RELATED APPLICATION(S) AND CLAIM OF PRIORITY

The present application claims priority to U.S. Provisional Patent Application Ser. No. 61/751,144, filed Jan. 10, 2013, entitled "ALLOCATION OF DEVICE ID IN DEVICE TO DEVICE COMMUNICATIONS". Provisional Patent Application No. 61/751,144 is assigned to the assignee of the present application and is hereby incorporated by reference into the present application as if fully set forth herein.

TECHNICAL FIELD

The present application relates generally to device discovery and, more specifically, to a assigning a device identification (ID) of a device-to-device (D2D) network to a mobile station.

BACKGROUND

Traditional wireless communication networks involve a device communicating with a base station or access point. The base station or access point serves a group of users in a geographic region or cell. A device-to-device (D2D) network is a wireless communication network that supports device-to-device communications with or without utilizing access points or base stations. D2D communication may be used to implement many kinds of services that are complementary to the primary communication network or provide new services based on the flexibility of the network topology.

In a D2D wireless communication network, device discovery is needed for devices to understand the network topology and identify other devices in its vicinity. Device discovery is accomplished using discovery message signaling by the devices in the network. If a device identifies other devices in its vicinity, the device can use that information to establish communication link with those devices. If a base station is also in communication range of the devices in a D2D network, then the base station can also assist in the setting up of D2D communication links.

In the case of Wi-Fi Direct, devices identify each other by using a peer-to-peer (P2P) Device Address which is set to be its globally administered MAC address (IEEE Std 802.11-2007).

SUMMARY

This disclosure provides a method and system for assigning a device identification (ID) of a device-to-device (D2D) network.

In a first embodiment, a method of assigning a device identification (ID) of a device-to-device (D2D) network to a mobile station is provided. The method includes: selecting a subset from a set of parameters from which the device ID is determined, each parameter in the set having a number of bits for complete representation, the subset comprising a number $N_{d2d}$ of parameters used to determine the device ID; determining a number L of device ID bits to represent the device ID; dividing the L device ID bits into a group of $l_1$ indicator bits and a group of $l_2$ identifier bits, wherein $l_2$ is the difference between the number L of device ID bits and the number $l_1$ of bits allocated to the group of indicator bits; assigning bit values to the $l_1$ indicator bits; allocating a number $L_j^p$ of the $l_2$ identifier bits to each of the parameters in the subset; and assigning bit values the $l_2$ identifier bits according to one or more functions.

In a second embodiment, a base station (eNB) for assigning a device identification (ID) of a device-to-device (D2D) network to a mobile station is provided. The eNB includes processing circuitry configured to: select a subset from a set of parameters from which the device ID is determined, each parameter in the set having a number of bits for complete representation, the subset comprising a number $N_{d2d}$ of parameters used to determine the device ID; determine a number L of device ID bits to represent the device ID; divide the L device ID bits into a group of $l_1$ indicator bits and a group of $l_2$ identifier bits, wherein $l_2$ is the difference between the number L of device ID bits and the number $l_1$ of bits allocated to the group of indicator bits; assign bit values to the $l_1$ indicator bits; allocate a number $L_j^p$ of the $l_2$ identifier bits to each of the parameters in the subset; and assign bit values the $l_2$ identifier bits according to one or more functions.

In a third embodiment, a mobile station for assigning a device identification (ID) of a device-to-device (D2D) network is provided. The mobile station includes processing circuitry configured to: select a subset from a set of parameters from which the device ID is determined, each parameter in the set having a number of bits for complete representation, the subset comprising a number $N_{d2d}$ of parameters used to determine the device ID; determine a number L of device ID bits to represent the device ID; divide the L device ID bits into a group of $l_1$ indicator bits and a group of $l_2$ identifier bits, wherein $l_2$ is the difference between the number L of device ID bits and the number $l_1$ of bits allocated to the group of indicator bits; assign bit values to the $l_1$ indicator bits; allocate a number $L_j^p$ of the $l_2$ identifier bits to each of the parameters in the subset; and assign bit values the $l_2$ identifier bits according to one or more functions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4, 5 and 6 illustrate examples of device-to-device (D2D) networks according to embodiments of the present disclosure;

FIG. 7 illustrates a relationship between device properties and network parameters and transmission patterns according to embodiments of the present disclosure;

FIGS. 8A and 8B illustrate two neighboring physical cells and the mobile stations within each physical cell according to embodiments of the present disclosure;

FIG. 9 illustrates a timeline of D2D communications within a mobile station according to embodiments of the present disclosure;

FIG. 10 illustrates an example of a peer mobile device discovery time-frequency window for a network initiated device discovery according to embodiments of the present disclosure;

FIG. 11 illustrates a structure of a Device ID according to embodiments of the present disclosure;

FIG. 12 illustrates the space around an eNB divided into sub-regions that correspond to 3 bits that represent PRS Location information according to embodiments of the present disclosure;

FIG. 13 illustrates the region around the eNB divided into sub-regions that correspond to 4 bits that represent PRS Location information according to embodiments of the present disclosure;

FIG. 14 illustrates a mapping of GPS location information to be used in a device ID that is assigned to a mobile station according to embodiments of the present disclosure;

FIG. 15 illustrates a structure of a device ID in a Network Assisted Device ID Assignment with PRS and GPS Location according to embodiments of the present disclosure;

FIG. 16 illustrates a device ID structure in a network assisted device ID assignment, where GPS location information is the only location information used according to embodiments of the present disclosure;

FIGS. 22 and 23 illustrate device ID structures in an ad-hoc D2D network with GPS Location information according to embodiments of the present disclosure;

FIG. 24 illustrates a device ID structure in an ad-hoc D2D network with no GPS location information according to embodiments of the present disclosure;

FIG. 25 illustrates two neighboring physical cells and eNBs and the mobile stations within each physical cell according to embodiments of the present disclosure;

FIGS. 26 and 27 illustrate a device ID structure for hybrid D2D networks corresponding to examples of configurations according to embodiments of the present disclosure; and FIG. 28 illustrates an example of a device ID collision caused by having an insufficient number of parameters according to embodiments of the present disclosure.

DETAILED DESCRIPTION

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
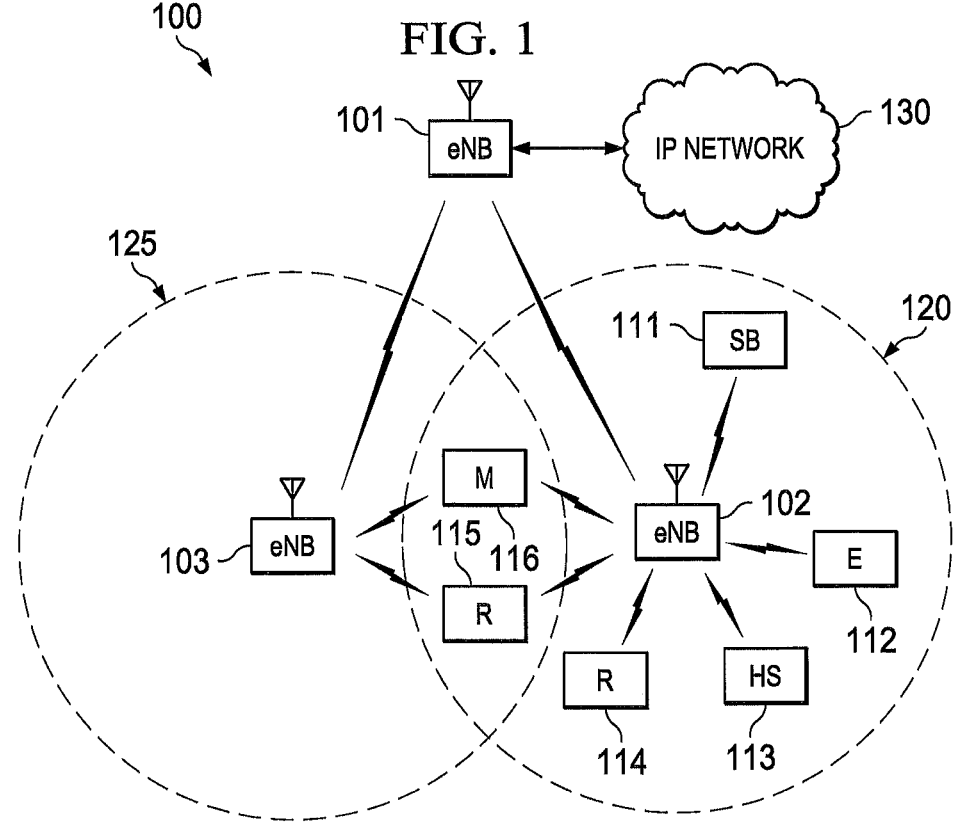
FIG. 1 illustrates an example wireless network according to this disclosure.

FIG. 1 illustrates a wireless network 100 according to one embodiment of the present disclosure. The embodiment of wireless network 100 illustrated in FIG. 1 is for illustration only. Other embodiments of wireless network 100 could be used without departing from the scope of this disclosure.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, embodiments of the present disclosure provide a system and method for assigning a device identification (ID) of a device-to-device (D2D) network. One or more of eNBs 101-103 include processing circuitry configured to: select a subset from a set of parameters from which the device ID is determined, each parameter in the set having a number of bits for complete representation, the subset comprising a number $N_{d2d}$ of parameters used to determine the device ID; determine a number L of device ID bits to represent the device ID; divide the L device ID bits into a group of $l_1$ indicator bits and a group of $l_2$ identifier bits, wherein $l_2$ is the difference between the number L of device ID bits and the number $l_1$ of bits allocated to the group of indicator bits; assign bit values to the $l_1$ indicator bits; allocate a number $L_j^p$ of the $l_2$ identifier bits to each of the parameters in the subset; and assign bit values the $l_2$ identifier bits according to one or more functions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
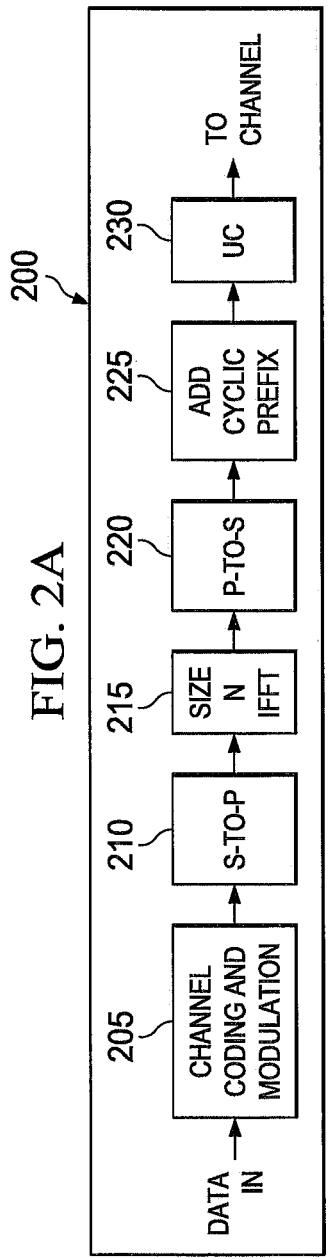
FIGS. 2A and 2B illustrate example wireless transmit and receive paths according to this disclosure.
Figure 2B:
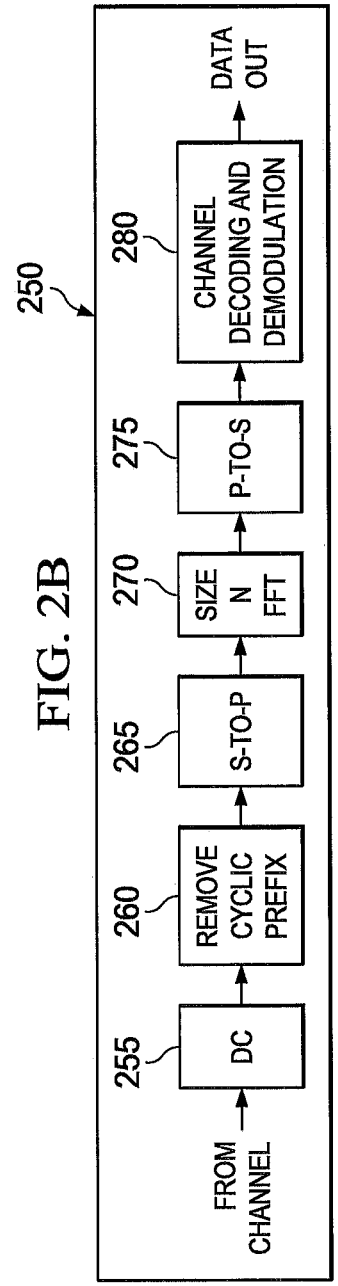

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to select a subset from a set of parameters from which the device ID is determined, each parameter in the set having a number of bits for complete representation, the subset comprising a number $N_{d2d}$ of parameters used to determine the device ID; determining a number L of device ID bits to represent the device ID; divide the L device ID bits into a group of $l_1$ indicator bits and a group of $l_2$ identifier bits, wherein $l_2$ is the difference between the number L of device ID bits and the number $l_1$ of bits allocated to the group of indicator bits; assigning bit values to the $l_1$ indicator bits; allocating a number $L_j^p$ of the $l_2$ identifier bits to each of the parameters in the subset; and assign bit values the $l_2$ identifier bits according to one or more functions.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
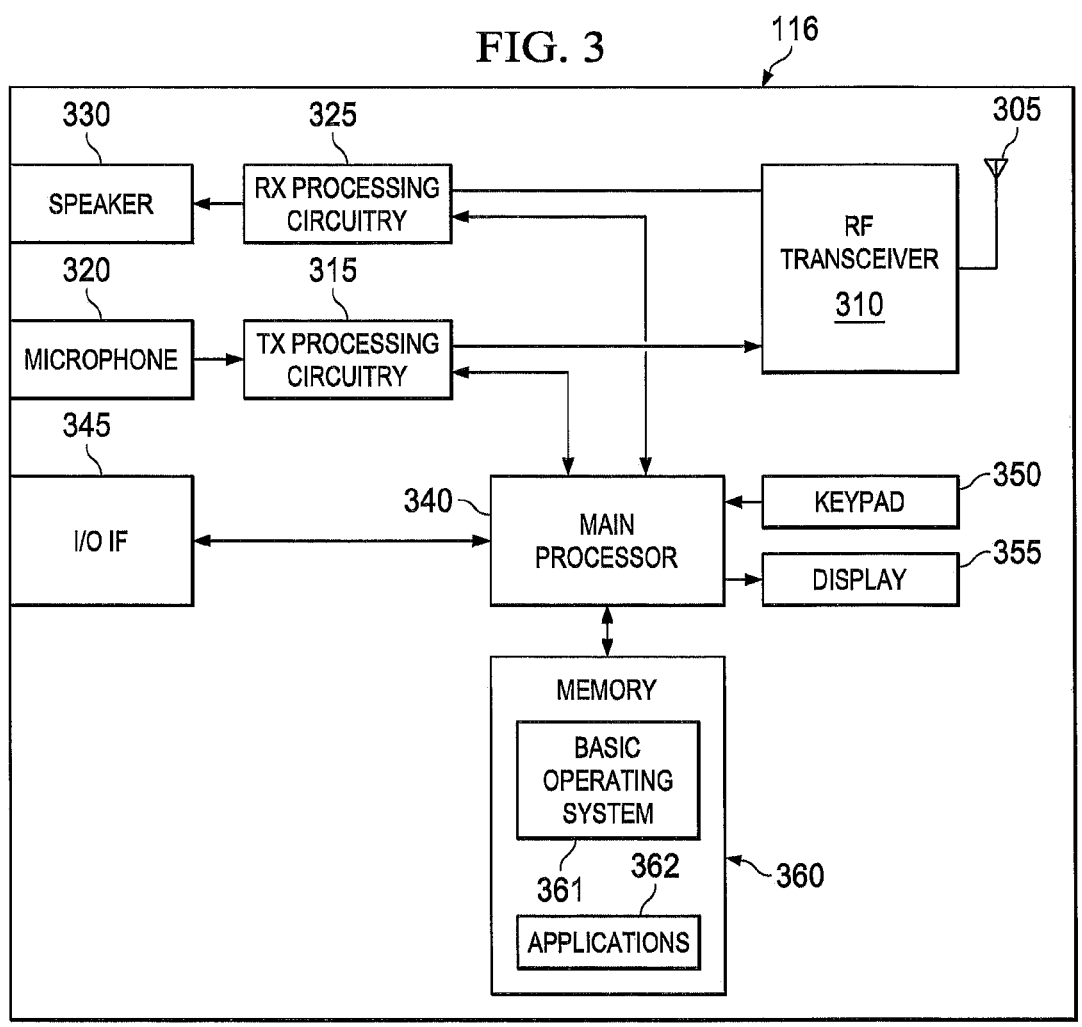
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for assigning a device identification (ID) of a device-to-device (D2D) network. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The millimeter (mm) spectrum may be utilized for broadband mobile communication systems. Radio waves in the mmWave band exhibit several unique propagation characteristics. For example, compared with lower frequency radio waves, mmWaves suffer higher propagation loss, have poorer ability to penetrate objects, such as buildings, walls, foliage, and are more susceptible to atmosphere absorption, deflection and diffraction due to particles (for example, rain drops) in the air. Given these propagation characteristics, it is crucial to employ high-gain (directional) antennas to communicate over the mmWave band. Fortunately, due to the smaller wavelength of the mmWaves, more antennas can fit in relatively a small area, making it feasible to design high-gain antennas in small form factors.

The commercial viability of the mmWave spectrum for mobile communication has been limited by the fact that mmWave RFIC development is based on expensive packaging techniques and involves the use of compound semiconductor processes. Only recently have advances been made in development of MMwave transceivers in inexpensive silicon processes using low-cost packaging techniques. The inexpensive silicon processes using low-cost packaging techniques for transceivers has spurred several recent engineering and business efforts for commercial exploitation of the mmWave spectrum, particularly in the context of short-range wireless communication. In particular, certain technologies and standards to transmit data at Gigabits/sec (Gbps) rate use the unlicensed 60 GHz band within a few meters (up to 10 meters). Several industrial standards have also been developed targeting similar performance (for example, WirelessHD technology, ECMA-387, and IEEE 802.15.3c), with a couple of other organizations also actively developing competing short-range 60 GHz Gbps connectivity technology, such as the Wireless Gigabit Alliance (WGA) and the IEEE 802.11 task group ad (TGad). Integrated circuit (IC) based transceivers are also now available for some of these technologies. For example, low-cost, low-power 60 GHz RFIC and antenna solutions are developing.

The aforementioned technological advances in the development of low-cost low-power mmWave RFIC and antenna solutions open up new avenues for mmWave communication system. In a fifth generation (5G) mobile broadband communication system, exploiting the vast mmWave spectrum is described. An essential component of the 5G system is the directional nature of communication between the eNodeB (eNB) and the mobile station (MS), in order to overcome the severe propagation losses encountered at mmWave frequencies. This directional nature of communication, wherein the eNodeB and the MS communicate using beams (typically formed using a large number of antennas), as opposed to using omni-directional communication in mobile systems, poses new challenges, and calls for innovations, in several aspects of communication system design. In this disclosure, we focus on the issue of allocation of device ID in device-to-device communications. In particular, the present disclosure provides solutions to the problem of determining a unique device ID of a device transmitting a discovery signal in device-to-device communications.

FIGS. 4, 5 and 6 illustrate examples of device-to-device (D2D) networks according to embodiments of the present disclosure. Embodiments of the present disclosure provide various device ID allocation strategies in a D2D communication network. In this disclosure, three different types of D2D networks and corresponding device ID assignment for these networks are described. The three different D2D networks are:

1) Network assisted D2D communications (examples of which are shown in FIG. 4);
2) Ad-hoc D2D communications with no network assistance (examples of which are shown in FIG. 5); and
3) Hybrid D2D communication networks (examples of which are shown in FIG. 6).

FIG. 4 illustrates an eNB Assisted D2D Network according to embodiments of the present disclosure. Although certain details will be provided with reference to the components of the eNB Assisted D2D Network 400, it should be understood that other embodiments may include more, less, or different components.

The eNB Assisted D2D Network 400 includes an eNB 410 and in-network mobile stations 420. The eNB 410 sends control signals 430 to each of the in-network mobile stations 420. The in-network mobile stations 420 send D2D discovery signals 440 to each other and perform network assisted D2D communication.

The embodiment of mobile station 420 illustrated in FIG. 4 is for illustration only. Other embodiments of a mobile station could be used without departing from the scope of this disclosure. Features of the in-network mobile station 420 could be used in other mobile stations, such as any of MS 300, MS 111, MS 112, MS 113, MS 114, MS 115 and MS 116.

The embodiment of eNB 410 illustrated in FIG. 4 is for illustration only. Other embodiments of an eNB could be used without departing from the scope of this disclosure. Features of the eNB 410 could be used in other mobile stations, such as any of eNB 101, eNB 102, and eNB 103.

FIG. 5 illustrates an ad-hoc D2D network with no eNB assistance according to embodiments of the present disclosure. Although certain details will be provided with reference to the components of the ad-hoc D2D network 500 it should be understood that other embodiments may include more, less, or different components.

The ad-hoc D2D network 500 includes multiple mobile stations 520. The mobile stations 520 send control, discovery, and data signals 530 to each other and perform ad-hoc D2D communication. The embodiment of mobile station 520 illustrated in FIG. 5 is for illustration only. Other embodiments of a mobile station could be used without departing from the scope of this disclosure. Features of the mobile station 520 could be used in other mobile stations, such as any of MS 300, MS 111, MS 112, MS 113, MS 114, MS 115 and MS 116.

FIG. 6 illustrates a hybrid D2D network according to embodiments of the present disclosure. Although certain details will be provided with reference to the components of the hybrid D2D network 600, it should be understood that other embodiments may include more, less, or different components.

The hybrid D2D network 600 includes an eNB 610, in-network mobile stations 420, 620, and out-of-range mobile stations 630. The eNB 610 sends control and configuration signals 430 to the in-network mobile stations 420. The eNB 610 sends partial control and configuration signals 640 to the in-network mobile stations 620. The in-network mobile station 620 establishes a hybrid D2D communication link 650 with the out-of-range mobile station 630 by sending D2D discovery signals and D2D data communications via the two-way communication link 650. The embodiment of eNB 610 illustrated in FIG. 6 is for illustration only. Other embodiments of an eNB could be used without departing from the scope of this disclosure. Features of the eNB 610 could be used in other mobile stations, such as any of eNB 101, eNB 102, and eNB 103.

Certain in-network mobile stations 420 send D2D discovery signals 430 to each other and perform network assisted D2D communication. Certain in-network mobile stations 620 send D2D discovery signals 640 to out-of-range mobile stations 630 and perform hybrid D2D communications. Certain out-of-network mobile stations 520 send control, discovery, and data signals 530 to each other and perform ad-hoc D2D communication.

The embodiments of mobile stations 620 and 630 illustrated in FIG. 6 are for illustration only. Other embodiments of mobile stations could be used without departing from the scope of this disclosure. Features of the mobile stations 620 and 630 could be used in other mobile stations, such as any of MS 300, MS 111, MS 112, MS 113, MS 114, MS 115 and MS 116.

Wi-Fi Direct does not utilize a centralized or synchronized discovery protocol. A advantage of using a centralized or synchronized discovery protocol is that the relevant D2D parameters including device ID allocation can be adapted to a variety of network topologies, user densities, and use cases. Additionally, spectrum may be more efficiently utilized, since D2D discovery and communications may be directly integrated with the overall cellular communication protocol.

In D2D communications device discovery, listening devices attempt to decipher the device ID of the device transmitting the discovery signal. The device identifications (IDs) in a D2D communication network can be allocated in a variety of ways as described more particularly below.

FIG. 7 illustrates a relationship between device properties and network parameters 710 (herein, device properties and network parameters are referred to collectively or separately by reference number 710), device IDs 720 (or pattern IDs), and transmission patterns 730 according to embodiments of the present disclosure. The network eNB 740, 410, 610 can set up the D2D communication link or can set up the device discovery process. D2D communications are more limited by range than other cellular communications. As a result, it is important for a mobile device to be aware of its neighboring mobile devices in the network.

The device discovery process is an important step in establishing and maintaining D2D communications. The device discovery process in D2D communications can either be network initiated or device initiated. In the case of user initiated device discovery, a mobile station 420, 620 can distinguish between the network assisting or not assisting in setting up the device discovery process. This disclosure describes three different device discovery methods that can be implemented by the mobile station:

1) Network initiated device discovery;
2) User initiated network assisted device discovery; and
3) User initiated device discovery with no network assistance.

In D2D networks, the mobile devices communicating with each other and with the network eNB 740, 410, 610 need to identify each other. The mobile station 720a-d is assigned a device ID 720 based on different network and device parameters. The mobile devices 750*a-d* in a D2D network are assigned a transmission pattern 730, and each mobile device 750*a-d* transmits using the assigned transmission pattern 730. Mobile devices 750*a-d* attempt to identify each other by identifying the transmission patterns 730. The transmission patterns 730 can represent a set of time/frequency resources in which a mobile device transmits a discovery signal. In a QUALCOMM FLASHLINQ implementation of a D2D network, mobile devices are assigned a set of time frequency resources in which they transmit a discovery signal. Other mobile devices listening to the transmitted discovery signal can decode the discovery signal sequences and identify the devices transmitting the discovery signals. That is, the mobile devices are identified by their transmission pattern.

As shown in FIG. 7, the network 701 includes an eNB 740, such as eNB 410 or 610, and multiple mobile stations 750*a-d*. Each mobile station 750*a-d* has corresponding physical device properties 710, such as a Cell ID, a location (for example: global positioning system (GPS) coordinates), or an International Mobile Station Equipment Identity (IMEI) number.

In the D2D network 701, such as the networks 400 or 600, the eNB 740 assigns a device ID 720 (or a pattern ID) to each of the in-network mobile devices 750*a-d*. The device ID 720 (or pattern ID) is determined using a function of a set of network and device parameters. That is, a device ID 720 of a D2D user equipment in a D2D network 701 can be determined as a function of a wide range of parameters including, but not restricted to:

1) Physical Cell Identity (PCI) of serving cell;
2) Cell Radio Network Temporary Identity (C-RNTI);
3) Location information based on PRS (Positioning Reference Signal);
4) Location information based on GPS (Global Positioning System) or GNSS (Global Navigation Satellite System);
5) PCI of neighboring cells; and
6) Unique UE ID (such as International Mobile Equipment Identity (IMEI) number or media access control (MAC) address).

The function can be either a one-to-one or a many-to-one mapping function, depending on the size (e.g., number of bits) of device ID and the number of mobile devices in the D2D network. In the example shown in FIG. 7, four (4) is the number of mobile devices 750*a-d* in the D2D network 701.

The eNB 740 maps the pattern IDs 720 to transmission patterns 730 of devices. The mapping of pattern IDs 720 to transmission patterns 730 can also be either a one-to-one function or a many-to-one function. The transmission pattern 730 can also be time varying (for example, transmission patterns of a device changes from one to another as the subframe evolves, according to a pre-defined pattern hopping rule). In this case, the transmission pattern 730 is a function of the device ID 720 and time index (for example, subframe index, radio frame index, etc.).

The eNB 740 assigns a first device ID 00 that corresponds to a first transmission pattern to first device 750*a*. The eNB 740 assigns a second device ID 01, which corresponds to a second transmission pattern, to a second device 750*b*. The eNB 740 assigns a third device ID 10, which corresponds to a third transmission pattern 730, to a third device 750*c*. The eNB 740 assigns a fourth device ID 11 that corresponds to a fourth transmission pattern 730 to a fourth device 750*d*. Each device ID 720 is different from the other device IDs assigned by the eNB 740; accordingly, each in-network mobile device 750*a-d* has a unique device ID. Each transmission pattern 730 corresponds to a pattern ID 720 and is different from each other transmission pattern assigned by the eNB 710.

Embodiments of the present disclosure include a direct mapping from the device and system parameters to the transmission pattern 730, which is a more challenging design. Certain embodiments of the present disclosure include a mapping function that includes the device/pattern ID 720, which is a compact representation of the network and device parameters.

The device properties and network parameters 710 can be grouped into categories, such as network configured parameters, location parameters, and unique UE ID. The network configured parameters include the PCI and the C-RNTI. The physical cell identity (PCI) specifies the identifier for the cell. In LTE, there are 504 PCI values ranging from 0-503. The C-RNTI is a unique identifier for a device within a cell that is configured by the eNB 740. In LTE, 16 bits are allocated for the C-RNTI identifier. As a baseline configuration method, the eNB 740 concatenates the PCI and C-RNTI identifiers to represent the device ID of devices in D2D networks.

In addition to the network configured parameters, location parameters can be used in representing device IDs 720. The location parameters include location information provided by the positioning reference signal (PRS), a GPS service, a GNSS service, and the comparative strength of the PCI.

Location information provided by the PRS can be used in representing device IDs 720. The mobile devices 750*a-d* receive PRS transmitted by an indicated set of neighboring base stations (via PCI indication). The PRS measurement consists of measuring the Reference Signal Time Difference (RSTD) of an indicated neighbor cell and a reference cell (serving cell). The RSTD for the measured cells are then sent to the eNB 740 in a 14-bit field. The units of RSTD are RSTD×3×$T_s$, with $T_s=1/(15000\times2048)$ seconds. The eNB 740 then forwards the measurements to a location server which computes the location. Accuracy is 50-200 m depending on the PRS signal quality.

Some mobile devices 750*a-d* have GPS or GNSS services inbuilt, which provide location information. This GPS or GNSS location information can also be used in the device ID assignment 720. Mobile devices 750*a-d* with such services may be requested to provide a GNSS measurement for each GNSS satellite (up to 8) via a 21 bit field (the units are fractions of a millisecond (that is, the range is $1\text{-}2^{21}$ milliseconds)). These measurements are then forwarded to a location server that computes the location. Alternatively, the mobile device may be requested to compute its location itself and send the computed location to the eNB 740, in which case the mobile device forwards the location information using 23 bits for the latitude and 24 bits for the longitude.

The location information of mobile devices 750*a-d* can also be represented if the PCI of strongest neighboring cell is known. It can be assumed that mobile devices separated by a large distance have different strongest neighboring cells.

Unique UE ID can be used in representing device IDs 720. Certain unique UE-IDs are used in representing mobile device IDs 720. Examples of UE IDs include the MAC address or the IMEI ID of the mobile device. The MAC address is usually a 48 bit field, whereas the IMEI identity is usually a 19 decimal field.

The total set of parameters from which the device ID of a D2D network is determined from is denoted by P. A specific D2D network may not use all the parameters in P to determine the device ID of the devices in the network. The set of parameters used by a specific D2D network is denoted by $P_{d2d}$. The set of parameters used by the mobile devices in a D2D network in device ID assignment depends on the type of D2D network. For example, if the D2D network, such as 400, 600 includes in-network mobile devices 420 in network range and the eNB 410, 610 enables the setting up of D2D communication links, then the PCI and C-RNTI can be elements of the set $P_{d2d}$. On the other hand, if the D2D network 500 includes mobile devices 520 communicating in an ad-hoc manner without network assistance, then PCI, C-RNTI, and PRS based location information are not elements of the set $P_{d2d}$. The total number of parameters in the set P is denoted by $N_P$. The number of parameters in the set $P_{d2d}$ is also denoted by $N_{d2d}$.

As a non-limiting example, in a D2D network, either the eNB 410, 610 or a mobile device determines a device ID 720 to assign to a mobile station using any of the following six parameters: PCI, C-RNTI, PRS, GPS, GNSS, MAC address, IMEI ID. Accordingly, those six parameters establish the set P={PCI, C-RNTI, PRS, GPS, GNSS, MAC address, IMEI ID}, and the set P includes a total of $N_P$=7 parameters. If the D2D network is an eNB Assisted D2D Network 400, then the set $P_{d2d}$={PCI, C-RNTI, PRS, GPS, GNSS, MAC address, IMEI ID} and $N_{d2d}$=7. If the D2D network is an ad-hoc network 500, then the set $P_{d2d}$={PRS, GPS, GNSS, MAC address, IMEI ID} and $N_{d2d}$=5. If the D2D network is a hybrid D2D network 600, then the set $P_{d2d}$={PCI, C-RNTI, PRS, GPS, GNSS, MAC address, IMEI ID} and $N_{d2d}$=7.

It is to be noted that all the parameters in the set $P_{d2d}$ may not be used in the device ID assignment of all devices in the specific D2D network. For instance, a D2D network may include some mobile devices that have GPS location information while other mobile devices do not have GPS location information. In such networks, GPS location can be included in the set $P_{d2d}$. Then, the mobile devices that have GPS location information may use the GPS location information along with the other parameters in their device ID assignment, but other devices without the GPS location information use just the other parameters in their device ID assignment.

FIGS. 8A and 8B illustrate two neighboring physical cells and the mobile stations within each physical cell according to embodiments of the present disclosure. In FIG. 8A, a mobile device A 810 is in a first physical cell 815, and mobile device B 820 is in a second physical cell 825, yet both mobile devices A 810 and B 820 have the same C-RNTI ID.

There are several reasons for incorporating many parameters in assigning the device ID. The mobile devices within a cell are assigned a unique C-RNTI ID during a Radio Resource Control connected (RRC-connected) mode (provided the mobile devices are in the coverage area of the eNB). However, the C-RNTI by itself may not be enough to represent the device IDs in D2D networks. This is because D2D communication can happen between devices that are in different physical cells, for example, as shown in FIG. 8A, where mobile devices have the same C-RNTI.

FIG. 8B illustrates a different scenario, where mobile device A 810 and mobile device C 830 have the same C-RNTI, and cause uncertainty to device B 840 which intends to discover both mobile devices 810 and 830. The mobile device A 810 is in a first physical cell 815, and a second physical cell 835 includes the mobile device C 830 and the mobile device B 840. The mobile device B 840 is in close proximity to the boundary between the neighboring cells 815 and 835. To avoid uncertainty within the device B 840, the device ID 720 incorporates both the PCI as well as the C-RNTI.

FIG. 9 illustrates a timeline of D2D communications within a mobile station, such as MS 420, 520, 620, according to embodiments of the present disclosure. The embodiment of the timeline 900 shown in FIG. 9 is for illustration only. Other embodiments could be used without departing from the scope of this disclosure.

The timeline 900 includes a series of a D2D peer device discovery time-frequency resources window 910 followed by a D2D data communication time-frequency resources window 920. In certain D2D networks, the network eNB configures a peer device discovery time/frequency window 910. That is, a set of time/frequency resources 910 are allocated for D2D device discovery periodically and no data communication happens in these resources. No D2D peer device discovery happens in the periodic data communication resource 920. The data communication part 920 and the device discovery part 910 of the D2D communications alternate. In small cell networks (such as urban micro), where the cell size may be small (fewer than 100 meters), then using PCI and C-RNTI may not be enough to remove uncertainty if two devices separated by a distance of 1 km want to communicate with each other. Other parameters such as location information from GPS and PRS signals (useful in D2D networks with separate network configured device discovery time/frequency windows as discussed below) and unique UE IDs such as MAC ID or IMEI ID (useful in networks with user initiated peer device discovery or when mobile devices are not in network range). Incorporating location information has several technical advantages in device discovery and D2D communications.

FIG. 10 illustrates an example of a peer mobile device discovery time-frequency window 1000, such as D2D peer device discovery time-frequency resources window 910, for a network initiated device discovery according to embodiments of the present disclosure. The embodiment of the time-frequency window 1000 (also referred to as a resource map) shown in FIG. 10 is for illustration only. Other embodiments could be used without departing from the scope of this disclosure.

The time-frequency window 1000 includes sixteen (16) subframes 1010 (SF1-SF16). Each subframe includes a group of multiple time slots 1020, shown as columns, and a N resource blocks 1030, shown as groups of subcarriers 1040 (represented by rows). Each mobile device transmits its discovery signal in 16 resource elements, in which case the discovery signal of the mobile devices would have a length of 16. The discovery signal length is equal to the number of time/frequency resource elements allocated to each user equipment or mobile device.

Within the configured discovery time/frequency window 1000, each mobile device is assigned a set of resource elements 1050 on which each of the mobile devices transmit their discovery signal. The set of resource elements 1050 to transmit discovery signal (also called the transmission pattern) can be explicitly configured by the network (or eNB), or the set of resource elements 1050 can be determined by the UE's device ID 720. Device ID assignment is a process towards determining the transmission pattern.

The black device 1060 (namely, the mobile device represented by the solid black hatching) transmits in the first OFDM symbol on a first subcarrier in all the 16 subframes. The discovery signal of the black device 1060 can be represented by a subcarrier number (which is 1) and a sequence of numbers (i.e., (1,1,1,1,1,1,1,1,1,1,1,1,1,1,1,1)), where each number denotes the OFDM symbol number in the subframe where the device transmits. In another example, the discovery signal of the blue device (namely, the mobile device represented by the horizontal crosshatching) can be represented by a subcarrier number (which is 1) and a sequence of numbers (3, 2, . . . , 14).

In the example shown in FIG. 10, the discovery signal length is equal to 16 and each device transmits in one resource element per subframe. However, the discovery signal length could be less than 16. In another example, the discovery signal length is 8 and 16 subframes are assigned for device discovery, and a mobile device is assigned 8 time-frequency resources to transmit its discovery signal. In that example, the discovery signal of the mobile device is represented by a 16-number sequence such as (1, 0, 2, 0, 5, 0, 1, 0, 7, 0, 3, 0, 8, 0, 10, 0), where zero denotes that the device does not transmit in that subframe.

When a mobile device is not transmitting its discovery signal, mobile device listens to discovery signals transmitted by other users. Spreading the discovery signal across several time-frequency resource elements overcomes potential problems in other mobile devices may not be able to listen to all the transmissions of a particular device. By spreading the transmissions across several time/frequency resource elements, other devices can discover the device by listening to a certain minimum number of transmissions from the particular device.

In a D2D network that supports a network configured device discovery time/frequency window, each device is assigned specific time/frequency resources in which to transmit its discovery sequence. The transmission pattern for the mobile devices is tied to the device IDs. One of the main goals in device discovery design in a D2D network is to maximize the probability of detecting peer mobile devices located close to a particular mobile device. Compared with cellular communications, D2D communications can be limited more by distance and hence, it is likely that mobile devices will choose to only communicate with other mobile devices that are in their vicinity or in close proximity. The transmission pattern of discovery signals for mobile devices is configured carefully to satisfy this goal. In order for two mobile devices to discover each other in the device discovery process, the discovery transmission pattern of the mobile devices should not overlap beyond a threshold. It can be seen that, the higher the overlap in transmission pattern, the lower the probability of device detection. Hence, using location information, the overlap between the transmission patterns of devices located close to each other is reduced.

FIG. 11 illustrates a structure of a Device ID, such as device ID 720, according to embodiments of the present disclosure. The embodiment of the Device ID structure 1100 shown in FIG. 11 is for illustration only. Other embodiments could be used without departing from the scope of this disclosure. According to embodiments of the present disclosure, different methods of allocating device IDs are applied for different D2D network scenarios. The device ID of a device in a D2D network consists of L bits, determined as a function of the parameters in the parameter set $P_{d2d}$ In one method of device ID assignment, the L bits can be partitioned into two groups, for example: a first group of Initialization bits 1110 (also referred to as Indicator bits) and a second group of Identifier bits 1120. The first group 1110 comprises $l_1$ bits, which are indicator bits 1015 specifying the parameters used in the device ID assignment. The second group 1120 comprises the remaining $l_2=L-l_1$ bits, which are the main ID (identifier) bits 1125. The group of initialization bits 1110 can be a bitmap, each bit of the bitmap indicates whether a specific parameter (e.g., one out of the 5 parameters (PCI parameter; C-RNTI parameter; PRS parameter; location information parameter based on PRS or GPS or GNSS or PCI of neighboring cells; and UE unique ID parameter) described above) is used or not in the second group 1125. However, this is just one example of device ID assignment.

In certain embodiments, the group of indicator bits 1110 can also refer to the parameters used in the device ID assignment without being an exact bitmap. For instance, if the parameter set $P_{d2d}$ has 4 parameters and all the devices have device IDs determined from 4 possible combinations of the 4 parameters, then the combination of parameters used in the device ID assignment can be specified using just 2 bits. The number of indicator bits, $l_1$ can be zero. This can happen if all mobile devices in the D2D network use the same parameters in determining their device IDs.

The present disclosure describes various embodiments of this process of device ID assignment in a D2D network. The methods of device ID assignment according to this disclosure distinguish in-network 420, 620 and out-of-network devices 520 (or out-of-range mobile devices 630) in hybrid networks 600. In general, in-network devices are expected to use network parameters such as PCI, C-RNTI in their device ID assignment, and out-of-network devices will not be able to use these network parameters such (i.e., PCI, C-RNTI).

FIG. 11 can be used to show an example of a method of constructing indicator bits using a bitmap to indicate a parameter set for device ID construction. For the example Device ID structure 1100 shown in FIG. 11, and the parameter set is given by: $P_{d2d}$={PCI, C-RNTI, PRS, GPS, UE unique ID}; L=36 bits is used to represent the Device ID of devices in the D2D network; $l_1$=5 bits 1115 of the group of Indicator bits 1110; and the second group 1120 comprises the remaining $l_2=L-l_1=31$ identifier bits 1125. That is, the 36 bits are partitioned into two groups—the 5 most significant bits are the initialization bits specifying the parameters used in the device ID assignment. The remaining 31 bits are the main device ID bits.

In this example, the indicator bits 1115 are used to specify which parameters are used to form the device ID 1110. That is, $b_{35}$ is used to indicate if the PCI has been used in deriving the device ID. If the PCI has been used in assigning the device ID, the initialization bit 1115 $b_{35}$ is set to 1, and if the PCI is not used in the device ID assignment (when the device is not in range of the network), then $b_{35}$ is set to 0. Similarly, $b_{34}$, $b_{33}$, $b_{32}$ and $b_{31}$ are used to indicate if the parameters C-RNTI, location information from PRS signal, GPS location information, unique UE ID are used in the assignment of device ID, respectively. The remaining identifier bits specify the main device ID. The different device ID assignment methods are described below and elaborated in different embodiments. The number of bits used to represent different parameters depends on the device ID assignment method.

In the example in FIG. 11, 5 indicator bits are used to provide information about the 5 parameters used in device ID assignment. This implies a case in which all $2^5=32$ configurations of parameters may be used by devices in device ID assignment. However, this may not always be the case.

Table 1 can be used to show an example of a method of constructing initialization bits using coding to indicate a parameter set for device ID construction. Table 1 is a mapping of parameters to Indicator Bits. In Table 1, the indicator bits are not exactly a bitmap to the parameters used in the device ID assignment. The parameter set contains the same 5 parameters (i.e., $P_{d2d}$={PCI, C-RNTI, PRS, GPS, UE unique ID}) as used in the example of FIG. 11. In this example, all mobile devices us only 4 possible parameter configurations in device ID assignment. The 4 parameter configurations are denoted by $P_1$, $P_2$, $P_3$ and $P_4$. For instance, 4 parameter configurations can be $P_1$={PCI, C-RNTI, PRS, GPS, UE unique ID}, $P_2$={PCI, C-RNTI, PRS, GPS}, $P_3$={GPS, UE unique ID} and $P_4$={UE unique ID}. In this example, a few as $l_1$=2 bits can be used to represent the parameters used in device ID assignment. When a mobile station transmits its Device ID, the indicator bits inform the mobile station receiving the device ID transmission whether the transmitting mobile station is an in-network MS or an out-of-network MS. That is, in response to receiving a Device ID transmission corresponding to $P_1$ or $P_2$, which both include network parameters (PCI and C-RNTI), the receiving mobile station determines that the transmitting mobile station is in-network. Also, in response to receiving a Device ID transmission corresponding to $P_3$ or $P_4$, in which neither include a network parameter (PCI and C-RNTI), the receiving mobile station determines that the transmitting mobile station is out-of-network.

TABLE 1

Mapping of Parameters to Indicator Bits

| Parameters used in Device ID Assignment | Indicator Bits |
|---|---|
| $P_1$ = {PCI, C-RNTI, PRS, GPS, UE unique ID} | 00 |
| $P_2$ = {PCI, C-RNTI, PRS, GPS} | 01 |
| $P_3$ = {GPS, UE unique ID} | 10 |
| $P_4$ = {UE unique ID} | 11 |

In another example of a method of constructing initialization bits, a zero bits are used for initialization bits (i.e, $l_1$=0). In this method of device ID assignment, where no indicator bits are used. This can happen if all the mobile devices in the network use the same parameters in their device ID assignments. Then, the presence of indicator bits is not necessary and all the bits in the device ID are used represent different parameters. An example is a network assisted D2D network 400 where all the devices in the network have eNB assistance and all the devices have access to GPS and PRS location information. Then all the in-network mobile devices 420 use the same parameter set given by: $P_{d2d}$={PCI, C-RNTI, PRS location, GPS location, unique UE id} in their device ID assignments. In another scenario, the network can choose not to use indicator bits 1110 in the device ID structure 1100 when mobile devices do not gain much information about the properties of mobile devices from the parameters used in the device ID assignment. This scenario is described in greater detail below with reference to Embodiment 8.

Indicator Bits 1110 in the Device ID provide several technical advantages, as described more particularly below. Several properties of the transmitting mobile device can be deduced from the device ID if indicator bits are present. In hybrid D2D networks 600, in-network 420, 620 and out-of-network devices 520 (including out-of-range devices 630) can be differentiated by using indicator bits 1110. Using indicator bits 1110, whether or not the mobile device uses location information in determining the device ID can be determined using indicator bits 1110. The information of whether or not the mobile device uses location information in determining the device ID can be used by other mobile devices to determine the location information of the transmitting mobile device. The location information can be used in determining the distance from other mobile devices, and as a result, the feasibility of D2D communications with other mobile devices. For example, a D2D device may search neighboring devices only over a subset of device IDs, where the subset of device IDs are constructed with location values close to the device's location value(s). This way, the complexity of mobile device search (discovery process) can be greatly reduced. The use of indicator bits 1110 need not be restricted to just specifying the parameters used in device ID assignment. This is just one specific use described in several embodiments of this disclosure. Indicator bits can be used for other purposes, for example, to indicate the nature of devices, the services rendered by the device, other information on the rest of the device ID such as number of bits used to represent different parameters, and the like. In one alternative, the mapping table of parameters to indicator bits is defined by the LTE standard. In another alternative the mapping of parameters to indicator bits is indicated to the mobile station by the eNB via a RRC configuration message.

In the case of in-coverage UEs (namely, in-network mobile stations 420, 620), the network (or eNB 410, 610) assists the in-coverage UE in determining its device ID. Three embodiments include:

1) Explicit indication: The in-network mobile station 420, 620 receives its entire device ID from the eNB 410, 610. As an example, the device ID is indicated to the in-network mobile station 420, 620 as part of the initial RRC_connection establishment. As another example, the device ID is indicated to the in-network mobile station 420, 620 as a field in the Discovery Setup Message (DSM) transmitted by the eNB 410, 610 prior to the configured discovery period.

2) Initialization configuration: The UE may receive from the eNB an indication of which parameters to use in the device ID creation. As an example, the indicator bits for the device ID are indicated to the in-network mobile station 420, 620 as part of the initial RRC_connection establishment. As another example, the indicator bits for the device ID are indicated to the in-network mobile station 420, 620 as a field in the Discovery Setup Message (DSM) transmitted by the eNB 410, 610 prior to the configured discovery period.

3) Additional Parameter Configuration: The UE receives from the eNB an additional parameter that specifies how to configure the device ID in certain special situations. For instance, if there is a device A in the network with a device ID=ID1 and the network determines that a different device B may also be configured with the same device ID under normal conditions, the network (or eNB) can configure an additional parameter to the device B so that device B can modify its device ID to be different from device A's device ID. As an example, the additional parameter could be a 1 bit message conveyed in the higher-layer (RRC) that indicates to device B that device B should add 1 to its device ID. In this case, device B would have device ID of ID1+1. As another example, the eNB 410, 610 could transmit an entirely new device ID to device B as the additional parameter.

In the case of out-of-coverage UEs (namely, out-of-network mobile stations 520 and out-of-range mobile stations 630), the out-of-coverage UE can choose from a set of parameters based on the availability of the parameters (location information, etc.) or may only select a single set of parameters defined by the LTE standard or previously configured by the network when the device was within network coverage. That is, the out-of-coverage UE can generate and transmit a device ID that includes device ID bits that are based on network parameters of when the now out-of-coverage UE was within network coverage.

Below, different device ID assignment methods based on different D2D network setting are described. Embodiments 1 to 4 include network assisted D2D networks 400 where all devices in the network are assumed to be in-network range (such as within the coverage area of the eNB 410). Embodiments 5 and 6 include device ID assignment in ad-hoc D2D networks 500 with no network assistance. Embodiment 7 includes device ID assignment in hybrid D2D networks 600 where mobile devices may or may not be in network coverage (such as within the coverage area of the eNB 610). Embodiments 1-7 include device ID assignment using identifier bits. In embodiment 8, the device ID assignment method uses no indicator bits.

Embodiment One

Network Assisted Device ID Assignment with GPS/PRS Location Information and with Unique UE ID Certain embodiments (denoted as "Embodiment one") include a method of assigning device IDs for in-network mobile devices, such as mobile device 420, in a D2D network with network assistance 400 and where mobile devices have access to GPS or PRS location information. That is, all the devices in the D2D network 400 are in-network range and have C-RNTI IDs. The parameter set $P_{d2d}$ is given by: $P_{d2d}$={PCI, C-RNTI, PRS location, GPS location, unique UE ID}.

Hence, it is assumed that PCI and C-RNTI are always used in the device ID assignment. It is also assumed that all the devices have a unique UE ID that is used in the device ID assignment. The unique UE ID could be the MAC ID of the device or the IMEI ID or a different unique ID or a combination of the MAC ID, IMEI ID, and other different unique ID.

Two initialization bits are used to specify whether PRS and GPS location information are used in the device ID assignment. Based on whether PRS and GPS location information are used or not, 4 different device ID assignments result. That at is, the presence of each of PRS and GPS location information is represented in the device ID using 2 indicator bits, one indicator bit for PRS location information and one indicator bit for GPS location information. The 2 indicator bits used are essentially a bitmap to the parameters PRS and GPS location information. If L is the total number of bits used in the device ID, then $b_{L-1}$ and $b_{L-2}$ are a bitmap to parameters PRS and GPS location information respectively. A parameter configuration number is defined that indicates the exact parameters used in the device ID assignment and hence the indicator bits used. If the device ID includes $l_1$ indicator bits, the parameter configuration number, denoted by j is given by i. $j = \sum_{i=-l_1}^{-1} b_{L+i} 2^{i+l_1}$ (1).

If the number of parameter configurations in device ID assignment is equal to one, or if no indicator bits are used, then network eNB sets the parameter configuration number equal to 1. The parameter configuration number j is essentially a decimal representation of the indicator bits. In this embodiment, the mapping of the indicator bits to the parameter configuration number is described in Table 2.

TABLE 2

Mapping of Indicator Bits to Parameter Configuration Number

| Parameters used | Indicator Bits | Parameter Configuration Number |
| --- | --- | --- |
| {PCI, C - RNTI, UE id} | 00 | 0 |
| {PCI, C - RNTI, UE id, GPS} | 01 | 1 |
| {PCI, C - RNTI, UE id, PRS} | 10 | 2 |
| {PCI, C - RNTI, UE id, PRS, GPS} | 11 | 3 |

In embodiments 1-7, as described above in reference to FIG. 11, the device ID is split into indicator bits 1100 and the identifier bits 1120 (also referred to as actual ID bits). The ID bits 1120 are further split into different portions corresponding to the different parameters used to determine the device ID. If 5 parameters are used in the device ID assignment, the ID bits are split into 5 parts. More particularly, when the parameter set $P_{d2d}$ has 5 parameters, the group of identifier bits 1120 is divided into 5 parts, each part corresponding to a respective parameter.

The total number of bits to represent the device ID (i.e., L), and the number of bits used to represent the different parameters (i.e., $l_1$ indicator bits) may depend on the parameters used in representing the device ID (i.e., $P_{d2d}$). In one example, the total number of bits used to represent the device ID could be the same irrespective of whether the GPS or PRS location information are used in the device ID assignment or not. In that case, one solution is to use the same number of bits to represent different parameters and to assign default bit setting to the missing parameters. That is, if 5 bits are assigned to represent GPS information, and GPS is not available for a particular device, then the device ID could include a default 5 bit sequence to represent the GPS information. Table 3 illustrates another solution, which is to adjust the number of bits allocated to the other parameters that are used so that the total number of bits stays the same. In Table 3, 36 bits represent the device ID irrespective of whether GPS and PRS location information are available or not.

TABLE 3

Allocation of Bits to Parameters where Total Number of Bits used for Device ID Stays the Same

| Parameters used | Number of PCI bits | Number of CRNTI bits | Number of PRS bits | Number of GPS bits | Number of UE-ID bits |
| --- | --- | --- | --- | --- | --- |
| PRS and GPS | 7 | 7 | 7 | 7 | 6 |
| Only PRS | 9 | 10 | 7 | — | 8 |
| Only GPS | 9 | 10 | — | 7 | 8 |
| No Location | 9 | 13 | — | — | 12 |

Table 4 shows another example of the allocation of bits to parameters, where the number of bits used for a parameter is fixed while allowing the total number of bits ($l_2$ and L) to vary according to the parameters used. An example is presented in Table 4.

TABLE 4

Scenario where Number of Bits for each Parameter is Fixed

| Parameters used | Number of PCI bits | Number of CRNTI bits | Number of PRS bits | Number of GPS bits | Number of UE-ID bits | Total number of indicator bits ($l_2$) |
| --- | --- | --- | --- | --- | --- | --- |
| PRS and GPS | 7 | 7 | 7 | 7 | 6 | 34 |
| Only PRS | 7 | 7 | 7 | — | 6 | 27 |
| Only GPS | 7 | 7 | — | 7 | 6 | 27 |
| No Location | 7 | 7 | — | — | 6 | 20 |

When device ID of a mobile device is determined using all the 5 parameters—PCI, C-RNTI, PRS location, GPS location and unique UE ID—both PRS and GPS location information are used, and the network eNB 410 sets the two initialization bits corresponding to PRS and GPS location information to a value of 1. In one method, the network eNB 410 uses the two most significant bits to represent the initialization bits. That is, $b_{L-1} = b_{L-2} = 1.$ (2).

Hence, the parameter configuration number is equal to 3. The remaining bits are determined as a function of the 5 parameter values. That is, $$(b_{L-3}, b_{L-4}, \ldots, b_1, b_0) = f(PCI, C\text{-}RNTI, PRS, GPS, UE\text{-}id) \quad (3)$$

In one method of device ID assignment, the $l_2 = L-2$ bits into 5 groups of bits of size $L_{1,3}^{pci}$, $L_{1,3}^{crnti}$, $L_{1,3}^{prs}$, $L_{1,3}^{gps}$ and $L_{1,3}^{ue\text{-}id}$. In $L_{i,j}^{p}$, where i represents the embodiment number (for example embodiment 1 through 8), j denotes the parameter combination number in the embodiment, and p denotes the parameter. In embodiment one, i=1, and j takes 4 values (0, 1, 2, 3). Accordingly, $L_{1,3}^{p}$ denotes the number of bits used for parameter p.

In LTE network, the PCI Information bits ($L_{i,j}^{pci}$) takes a value between 0 and 503. The eNB uses the function $f_{1,1}^{pci}$(PCI) to convert the PCI information into $L_{1,1}^{pci}$ bits. The bits are represented by $$\left(b_{L_{1,3}^{pci}-1}^{pci}, \ldots, b_0^{pci}\right) = f_{1,3}^{pci}(PCI). \quad (4)$$

In one example, the $L_{1,3}^{pci}$ least significant bits of the PCI are used, and $d_{1,3}^{pci}$ is the decimal representation of the bits. That is, $$d_{1,3}^{pci} = \sum_{i=0}^{L_{1,3}^{pci}} b_i^{pci} 2^i. \quad (5)$$

Each device in a LTE network is assigned a 16 bit C-RNTI ID during RRC. The network eNB 410 uses the function $f_{1,3}^{crnti}$(C-RNTI) to convert the C-RNTI ID of the device into $L_{1,3}^{crnti}$ bits to be used in the device ID. The bits are represented by $$\left(b_{L_{1,3}^{crnti}-1}^{crnti}, \ldots, b_0^{crnti}\right) = f_{1,3}^{crnti}(C-RNTI). \quad (6)$$

As an example, the network eNB 410 can use the $L_{1,3}^{crnti}$ least significant bits of the C-RNTI in the device ID assignment and $d_{1,3}^{crnti}$ is the decimal representation of the bits. That is, $$d_{1,3}^{crnti} = \sum_{i=0}^{L_{1,3}^{crnti}} b_i^{crnti} 2^i. \quad (7)$$

A mobile device in LTE network receives PRS location information signal from several eNBs. The mobile device uses the time-offset in the process of receiving these signals in determining its relative location with respect to the eNBs. This time-offset information is also reported to the eNB. The function $f_{1,1}^{prs}$(PRS) is used to convert the PRS relative location information into $L_{1,1}^{prs}$ bits according to the Equation 8.

$$\left(b_{L_{1,3}^{prs}-1}^{prs}, \ldots, b_0^{prs}\right) = f_{1,3}^{prs}(PRS). \quad (8)$$

FIG. 12 illustrates the space 1200 around an eNB 410 divided into sub-regions that correspond to 3 bits that represent PRS Location information according to embodiments of the present disclosure. The embodiment of the division of space 1200 shown in FIG. 12 is for illustration only. Other embodiments could be used without departing from the scope of this disclosure. In the example shown in FIG. 12, the space 1200 around the eNB 410 of an in-network mobile device 420, 620 is divided into six sub-regions 1210. The bits 1220 of the PRS can be used to indicate the sub-region in which the mobile device is present. Three (3) bits 1220 are used to indicate each sub-region 1210.

FIG. 13 illustrates the region 1300 around the eNB 410 divided into sub-regions that correspond to 4 bits that represent PRS Location information according to embodiments of the present disclosure. The embodiment of the division of space 1300 shown in FIG. 13 is for illustration only. Other embodiments could be used without departing from the scope of this disclosure. In the example shown in FIG. 13, the regions 1300 is divided into 16 sub-regions 1310, and 4 bits 1320 are used to indicate each sub-region 1310. Accordingly, in Equation 9, $d_{1,3}^{prs}$ is the decimal representation of the bits 1320. That is, $$d_{1,3}^{prs} = \sum_{i=0}^{L_{1,3}^{prs}} b_i^{prs} 2^i. \quad (9)$$

FIG. 14 illustrates a mapping of GPS location information to be used in a device ID that is assigned to a mobile station according to embodiments of the present disclosure. In the example shown in FIG. 14, the space 1400 is divided into a repeatable pattern 1410 of 4-subregions 1420, and 2 bits 1430 are used to indicate the sub-regions. The embodiment of the mapping 1400 shown in FIG. 14 is for illustration only. Other embodiments could be used without departing from the scope of this disclosure.

The GPS location information is converted into $L_{1,1}^{gps}$ bits according to Equation 10

$$\left(b_{L_{1,3}^{gps}-1}^{gps}, \ldots, b_0^{gps}\right) = f_{1,3}^{gps}(GPS). \quad (10)$$

The eNB 410 requests mobile devices with GPS or GNSS services to provide a GNSS measurement for each GNSS satellite (up to 8) via a 21 bit field (the units are fraction of a millisecond (i.e., the range is 1 to $2^{21}$ milliseconds). In certain embodiments, the eNB 410 forwards the GNSS measurements to a location server, which computes the location. In certain embodiments, the eNB 410 requests the mobile device 420 to compute the location of the mobile device 420, itself, and send the computed location to the eNB 410. The mobile device forwards the location information using 23 bits for the latitude and 24 bits for the longitude.

The present disclosure provides various methods of mapping of GPS location information to $L_{1,1}^{gps}$ bits to be used in the device ID. In one example method, an allocation of $L_{1,1}^{gps}/2$ bits represent the latitude and $L_{1,1}^{gps}/2$ bits represent the longitude information. In another example method, which is similar to the method used to represent the PRS relative location information, the entire space (such as the space 1200 or region 1300) within the coverage area of the eNB 410 is divided into repeatable patterns of sub-regions and the $L_{1,1}^{gps}$ bits is used to indicate in which sub-region (such as sub-region 1210 or 1310) the transmitting mobile device is present in. The bits 1430 that indicate the sub-regions 1420 of the mapping 1400 can be represented by a decimal representation according to Equation 11:

$$d_{1,1}^{gps} = \sum_{i=0}^{L_{1,3}^{gps}} b_i^{gps} 2^i. \quad (11)$$

The unique UE ID is mapped into $L_{1,3}^{ue-id}$ bits according to the Equation 12:

$$\left(b_{L_{1,3}^{ue-id}-1}^{ue-id}, \ldots, b_0^{ue-id}\right) = f_{1,3}^{ue-id}(UE - ID). \quad (12)$$

The UE-ID that is used depends on the type of D2D network and the type of mobile devices in the network. In one example, the device ID assigned to a mobile device is based in part on the MAC ID of the mobile device as the unique UE-ID. In another example, the device ID assigned to a mobile device is based in part on the IMEI ID of the mobile device. In deriving the $L_{1,1}^{ue-id}$ bits from the UE-ID, the $L_{1,1}^{ue-id}$ least significant bits of the UE-ID is used. For example, a decimal representation of the bits is determined using Equation 13:

$$d_{1,3}^{ue-id} = \sum_{i=0}^{L_{1,3}^{ue-id}} b_i^{ue-id} 2^i. \quad (13)$$

FIG. 15 illustrates a structure of a device ID in a Network Assisted Device ID Assignment with PRS and GPS Location, such as device ID 720, according to embodiments of the present disclosure. The device ID structure 1500 in FIG. 15 is for illustration only. Other embodiments could be used without departing from the scope of this disclosure. The device ID structure 1500 includes two initialization bits 1510, followed by a sequentially by a set of PCI bits 1520, a set of C-RNTI bits 1530, a set of PRS bits 1540, a set of GPS bits 1550, and a set of UE-ID bits 1560. The first initialization bit 1515 represents the presence of GPS location information, and the second initialization bit 1517 represents the presence of PRS location information.

The number of bits assigned for different parameters is an important criterion in the device ID assignment process. It is not always possible to completely represent all the parameters. As an example baseline implementation, a number of bits, such as nine (9) bits, are used to represent the PCI, and 16 bits are used to represent the C-RNTI ID of the mobile device. The other parameters are often too long (in terms of number of bits) to be completely represented. In certain embodiments, the size of the device ID is reduced to manageable portions by allocated a lesser number of bits to represent the parameters that would require a larger number of bits for complete representation.

In the baseline implementation, a baseline of 64 bits to represent the device ID, including 2 initialization bits, 9 bits to represent the PCI information, 16 bits to represent the C-RNTI information, 12 bits to represent the PRS location information, 12 bits to represent GPS location information, and 13 bits to represent the unique UE-ID. Table 5 summarizes a number L of bits used in the Device ID assignment in a network assisted D2D network with GPS and PRS location information.

TABLE 5

Number of bits used in Device ID Assignment with Network Assistance and GPS and PRS Location Information

| Device ID Scheme | Total number of bits L | Number of PCI bits $L_{1,3}^{pci}$ | Number of C-RNTI bits $L_{1,3}^{crnti}$ | Number of PRS bits $L_{1,3}^{prs}$ | Number of GPS bits $L_{1,3}^{gps}$ | Number of UE-ID bits $L_{1,3}^{ue-id}$ |
|---|---|---|---|---|---|---|
| 1 | 64 | 9 | 16 | 12 | 12 | 13 |
| 2 | 48 | 9 | 16 | 7 | 7 | 7 |
| 3 | 40 | 6 | 12 | 6 | 6 | 8 |
| 4 | 36 | 6 | 12 | 5 | 5 | 6 |
| 5 | 32 | 6 | 9 | 5 | 5 | 5 |
| 6 | 24 | 4 | 6 | 4 | 4 | 4 |
| 7 | 24 | 6 | 6 | 3 | 3 | 4 |
| 8 | 24 | 6 | 9 | 0 | 0 | 7 |
| 9 | 16 | 4 | 6 | 0 | 0 | 4 |
| 10 | 16 | 6 | 8 | 0 | 0 | 0 |
| 11 | 16 | 4 | 10 | 0 | 0 | 0 |
| 12 | 16 | 2 | 12 | 0 | 0 | 0 |

FIG. 16 illustrates a device ID structure in a network assisted device ID assignment, where GPS location information is the only location information used according to embodiments of the present disclosure. That is no PRS location information is used to generate the device ID to be assigned to a mobile device in a network assisted D2D network, such as the network 400. The device ID structure 1600 in FIG. 16 is for illustration only. Other embodiments could be used without departing from the scope of this disclosure. The device ID structure 1600 includes two initialization bits 1610, followed by a sequentially by set of PCI bits 1620, a set of C-RNTI bits 1630, a set of GPS bits 1640, and a set of UE-ID bits 1650.

For mobile devices that are in-network range, but have location information only by GPS services (that is, the mobile device that does not have complete PRS location information and is hence PRS location information is not used in the assignment of device ID), the device ID assignment method follows along the same lines as the method described in reference to FIG. 15, where both PRS and GPS location information is used to determine the device ID.

There are two main differences between the method device ID assignment according to FIGS. 15 and 16. The first difference is that the first two initialization bits 1610 are set as 0 and 1 respectively. Initialization bits of 01 specifies that PRS location information is not used and GPS location information is used in determining the device ID. The parameter configuration number j is equal to 1 for this parameter combination.

The second main difference is that the remaining $l_2=L-2$ bits are divided into 4 groups of bits of sizes $L_{1,1}^{pci}$, $L_{1,1}^{crnti}$, $L_{1,1}^{gps}$ and $L_{1,1}^{ue\text{-}id}$ to represent the PCI, C-RNTI, GPS location information and UE-ID, respectively. The representation of these parameters (i.e., PCI, C-RNTI, GPS location information and UE-ID) in the device ID follows the same procedure as described above. The bits used in the device ID assignment are generated as follows:

$$\left(b^{pci}_{L_{1,1}^{pci}-1}, \ldots, b^{pci}_0\right) = f_{1,1}^{pci}(PCI), \tag{14}$$

$$\left(b^{crnti}_{L_{1,1}^{crnti}-1}, \ldots, b^{crnti}_0\right) = f_{1,1}^{crnti}(C-RNTI), \tag{15}$$

$$\left(b^{gps}_{L_{1,1}^{gps}-1}, \ldots, b^{gps}_0\right) = f_{1,1}^{gps}(GPS), \tag{16}$$

$$\left(b^{ue\text{-}id}_{L_{1,1}^{ue\text{-}id}-1}, \ldots, b^{ue\text{-}id}_0\right) = f_{1,1}^{ue\text{-}id}(UE-ID). \tag{17}$$

Figure 17:
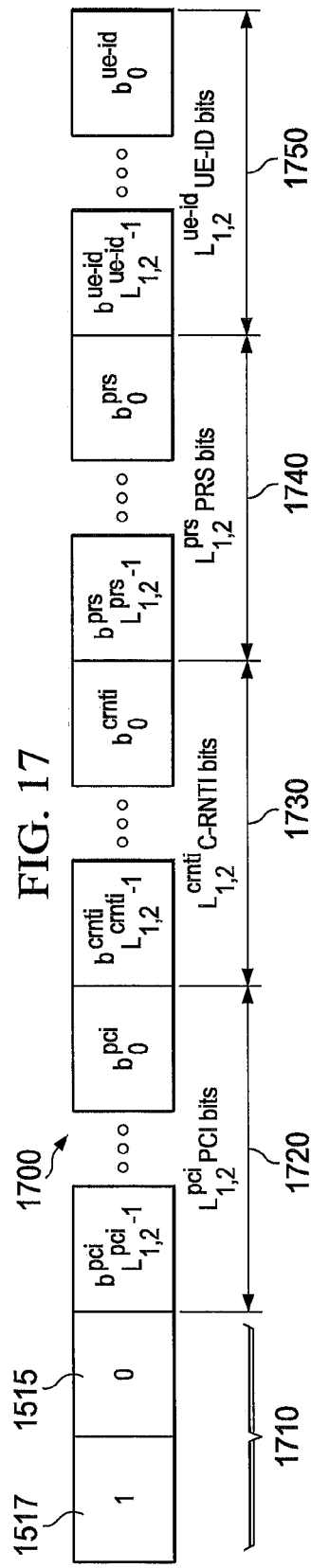
FIG. 17 illustrates a device ID structure in a network assisted device ID assignment, where PRS location information is the only location information used according to embodiments of the present disclosure.

FIG. 17 illustrates a device ID structure in a network assisted device ID assignment, where PRS location information is the only location information used according to embodiments of the present disclosure. That is no GPS location information is used to generate the device ID to be assigned to a mobile device in a network assisted D2D network, such as the network 400. The device ID structure 1700 in FIG. 17 is for illustration only. Other embodiments could be used without departing from the scope of this disclosure. The device ID structure 1700 includes two initialization bits 1710, followed by a sequentially by set of PCI bits 1720, a set of C-RNTI bits 1730, a set of PRS bits 1740, and a set of UE-ID bits 1750.

The device ID structure 1700 applies to mobile devices that are in-network range, but have location information only by PRS signaling. That is, device ID structure 1700 applies to mobile devices that do not have complete GPS location information; hence GPS location information is not used in the assignment of device ID. The device ID assignment method for the device ID structure 1700 follows along the same lines as the method described in reference FIG. 15 where both PRS and GPS location information is used to determine the device ID.

There are two main differences between the method device ID assignment according to FIGS. 15 and 17. The first difference is that the first two initialization bits 1710 are set as 1 and 0, respectively, to specify that PRS location information is used and GPS location information is not used in determining the device ID. The parameter configuration number j is equal to 2 for this parameter combination. The second main difference is that the remaining L-2 bits are divided into 4 groups of bits of sizes $L_{1,2}^{pci}$, $L_{1,2}^{crnti}$, $L_{1,2}^{prs}$ and $L_{1,2}^{ue\text{-}id}$ to represent the PCI, C-RNTI, PRS location information and UE-ID respectively. The representation of these parameters in the device ID follows the same procedure as described above. The bits used in the device ID are generated as follows:

$$\left(b^{pci}_{L_{1,2}^{pci}-1}, \ldots, b^{pci}_0\right) = f_{1,2}^{pci}(PCI), \tag{18}$$

$$\left(b^{crnti}_{L_{1,2}^{crnti}-1}, \ldots, b^{crnti}_0\right) = f_{1,2}^{crnti}(C-RNTI), \tag{19}$$

$$\left(b^{prs}_{L_{1,2}^{prs}-1}, \ldots, b^{prs}_0\right) = f_{1,2}^{prs}(PRS), \tag{20}$$

$$\left(b^{ue\text{-}id}_{L_{1,2}^{ue\text{-}id}-1}, \ldots, b^{ue\text{-}id}_0\right) = f_{1,2}^{ue\text{-}id}(UE-ID). \tag{21}$$

Figure 18:
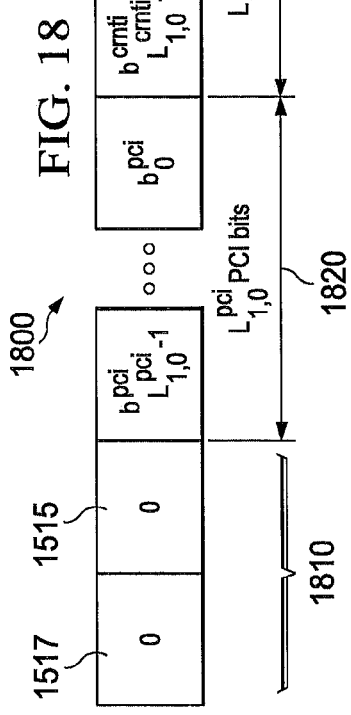
FIG. 18 illustrates a device ID structure in a network assisted device ID assignment using no location information according to embodiments of the present disclosure.

FIG. 18 illustrates a device ID structure in a network assisted device ID assignment using no location information according to embodiments of the present disclosure. The device ID structure 1800 in FIG. 18 is for illustration only. Other embodiments could be used without departing from the scope of this disclosure. The device ID structure 1800 includes two initialization bits 1810, followed by a sequentially by set of PCI bits 1620, a set of C-RNTI bits 1630, and a set of UE-ID bits 1640.

For mobile devices that are in-network range, but have no location information, the device ID assignment method follows along the same lines as the method described in reference to FIG. 15, where both PRS and GPS location information is used to determine the device ID.

There are two main differences between the method device ID assignment according to FIGS. 15 and 18. The first difference is that the first two initialization bits are set as 0 and 0, respectively, to specify that neither the PRS location information nor the GPS location information is used in determining the device ID. The parameter configuration number j is equal to 0 for this parameter combination. The second main difference is that the remaining L-2 bits are divided into 3 groups of bits of sizes $L_{1,0}^{pci}$, $L_{1,0}^{crnti}$ and $L_{1,0}^{ue\text{-}id}$ to represent the PCI, C-RNTI and UE-ID respectively. The representation of these parameters in the device ID follows the same procedure as described above. The bits used in the device ID are generated as follows:

$$\left(b^{pci}_{L_{1,0}^{pci}-1}, \ldots, b^{pci}_0\right) = f_{1,0}^{pci}(PCI), \tag{22}$$

$$\left(b^{crnti}_{L_{1,0}^{crnti}-1}, \ldots, b^{crnti}_0\right) = f_{1,0}^{crnti}(C-RNTI), \tag{23}$$

$$\left(b^{ue\text{-}id}_{L_{1,0}^{ue\text{-}id}-1}, \ldots, b^{ue\text{-}id}_0\right) = f_{1,0}^{ue\text{-}id}(UE-ID). \tag{24}$$

Second Embodiment

Network Assisted Device ID Assignment with Unique UE ID and with No Location Information Certain embodiments (denoted as "Embodiment two") include a method of assigning device IDs in network assisted D2D networks, such as mobile device 420, in a D2D network with network assistance 400 and where only PCI, C-RNTI ID, and unique UE ID are used in determining the device IDs. Location information is not used for device ID assignment in the D2D networks of embodiment two. Accordingly, set of parameters used by the specific D2D network of embodiment two is as follows:

$P_{d2d}$={PCI,C-RNTI,unique UE id}

By assumption, all the devices in the D2D network have access to PCI, C-RNTI ID and unique ID information, accordingly, the device ID assignment does not include any initialization bits. In one method of device ID assignment, we split the total L bits into 3 groups of bits of size $L_{2,1}^{pci}$, $L_{2,1}^{crnti}$ and $L_{2,1}^{ue-id}$ to represent the PCI, C-RNTI and unique UE-ID information.

Figure 19:
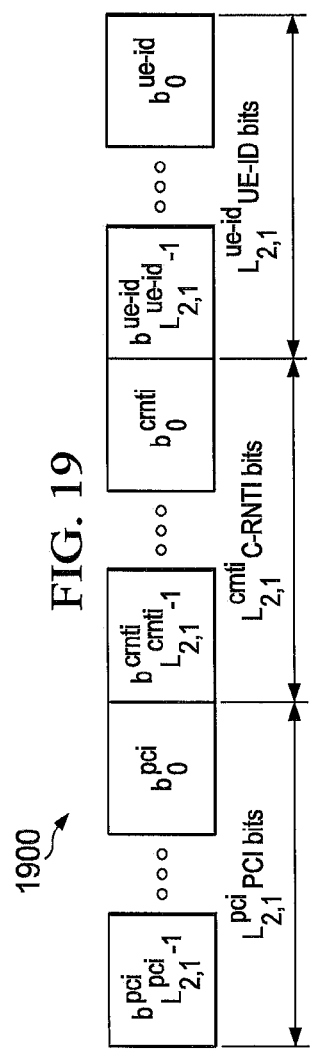
FIG. 19 illustrates a structure of a device ID in a Network Assisted Device ID Assignment with Unique UE-ID according to embodiments of the present disclosure.

FIG. 19 illustrates a structure of a device ID in a Network Assisted Device ID Assignment with Unique UE-ID according to embodiments of the present disclosure. The device ID structure 1900 in FIG. 19 is for illustration only. Other embodiments could be used without departing from the scope of this disclosure. The device ID structure 1900 includes a set of PCI bits 1910, followed by a set of C-RNTI bits 1920, followed by a set of UE-ID bits 1930, and no initialization bits. The device ID assignment from the PCI, C-RNTI and unique UE-ID information follows the same procedure described in reference to embodiment one. The bits used in the device ID are generated as follows:

$$\left(b^{pci}_{L^{pci}_{2,1}-1}, \ldots, b^{pci}_0\right) = f^{pci}_{2,1}(PCI), \quad (25).$$

$$\left(b^{crnti}_{L^{crnti}_{2,1}-1}, \ldots, b^{crnti}_0\right) = f^{crnti}_{2,1}(C-RNTI), \quad (26).$$

$$\left(b^{ue-id}_{L^{ue-id}_{2,1}-1}, \ldots, b^{ue-id}_0\right) = f^{ue-id}_{2,1}(UE-ID). \quad (27).$$

Table 6 shows different combinations of the total number of bits used for the device ID assignment (L) in a network assisted D2D network with UE-ID and the number of bits assigned to each parameter.

TABLE 6

Number of Bits used in Device ID Assignment for Network Assisted D2D Network with UE-ID

| Device ID Assignment Scheme | Total number of bits | Number of PCI bits | Number of C-RNTI bits | Number of unique UE-ID bits |
| --- | --- | --- | --- | --- |
| 1 | 64 | 9 | 16 | 39 |
| 2 | 48 | 9 | 16 | 23 |
| 3 | 40 | 9 | 16 | 15 |
| 4 | 36 | 6 | 16 | 14 |
| 5 | 36 | 9 | 16 | 11 |
| 6 | 32 | 6 | 16 | 10 |
| 7 | 32 | 9 | 12 | 11 |
| 8 | 32 | 6 | 12 | 14 |
| 9 | 24 | 6 | 8 | 10 |
| 10 | 16 | 4 | 8 | 4 |
| 11 | 16 | 4 | 6 | 6 |
| 12 | 16 | 2 | 8 | 6 |

The device ID allocation method according to embodiment two is useful in networks where separate time-frequency device discovery windows are not configured by the network eNB 410 for device discovery. In such networks, device discovery may be device initiated when the mobile device seeks to communicate with another mobile device.

Figure 20:
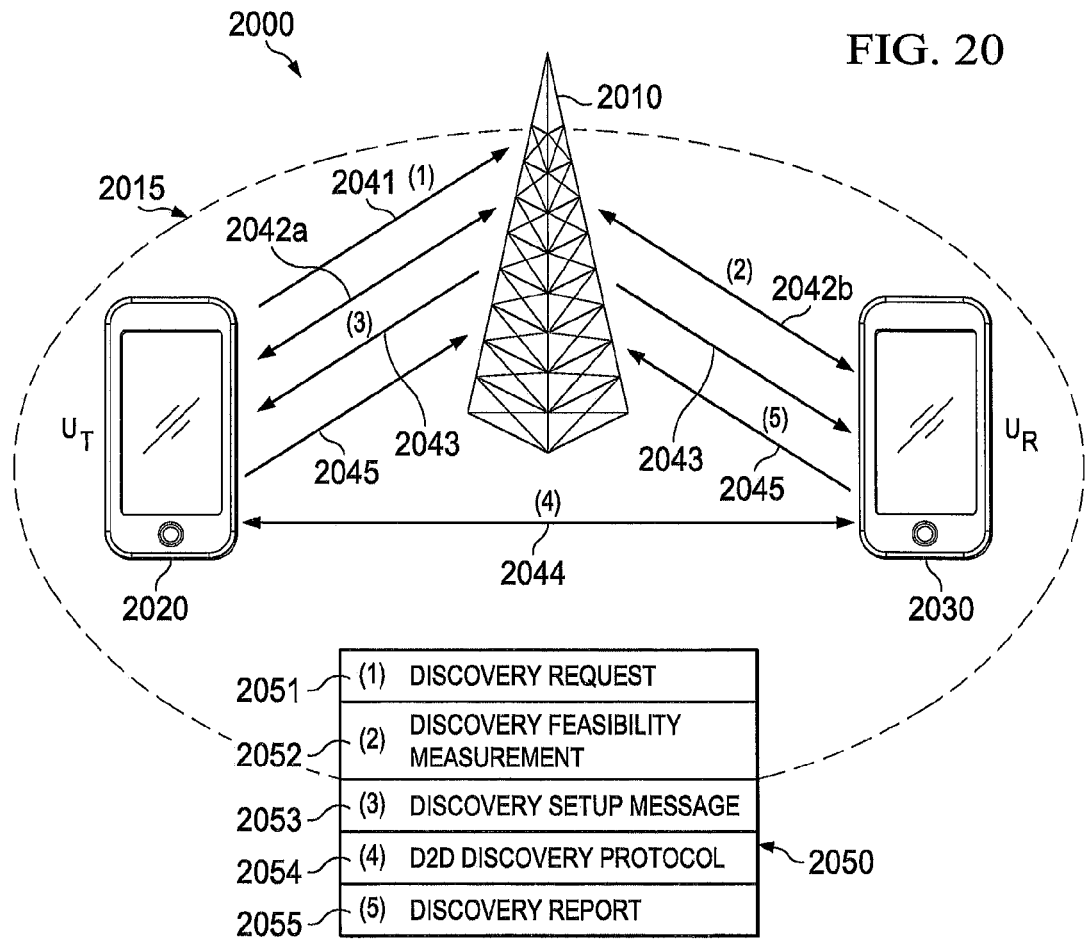
FIG. 20 illustrates a D2D network with D2D communication and device discovery on an as needed basis according to embodiments of the present disclosure.

FIG. 20 illustrates a D2D network with D2D communication and device discovery on an as needed basis according to embodiments of the present disclosure. The D2D network 2000 in FIG. 20 is for illustration only. Other embodiments could be used without departing from the scope of this disclosure. The D2D network 2000 includes an eNB 2010 having a coverage area 2015, a transmitting mobile station 2020 (also referred to as $U_T$ or transmitting device), and a receiving mobile station 2030 (also referred to as $U_R$ or receiving device). That is, the transmitting mobile station 2020 and the receiving mobile station 2030 are within the physical cell of the eNB 2010. More particularly, in the D2D network 2000 with network assisted device discovery, such as in the network 400, the eNB 2010 implements a device discovery method in response to a user initiation.

In the D2D network 2000 with user initiated and network assisted device discovery, users initiated device discovery on a per need basis and use the network assistance in the setup of device discovery. When a mobile device attempts to communicate with another device, the device communicates its intention to the network which then acts as a bridge in setting up the device discovery process to determine if the two devices are in communication range of each other.

In the method 2050 of users initiated device discovery shown in FIG. 20, the eNB 2010 assists in setting up device discovery and D2D communication between two devices $U_T$ 2020 and $U_R$ 2030. The system (eNB 2010 and MSs 2020 and 2030) within the network 2000 implements method 2050 beginning in block 2051.

In block 2051, the transmitting mobile station 2020 ($U_T$) transmits a discovery request 2041 to the eNB 2010. For example, in response to a user selection to seek to communicate with another mobile device, the transmitting mobile station 2020 ($U_T$) transmits the discovery request 2041. The system proceeds to block 2052.

In block 2052, in response to receiving the discovery request 2041, the eNB 2010 performs a discovery feasibility measurement. That is, the eNB and the in-network mobile stations 2020 and 2030 engage in two way communications 2042 for the network (or eNB 2010) to determine the feasibility establishing and maintaining D2D communications between the in-network mobile stations 2020 and 2030. For example, the two way communications 2042 can include eNB 2010 sending a request for location information to the mobile stations 2020 and 2030. The two way communications 2042 can further include the response of the mobile stations 2020 and 2030 providing location information to the eNB 2010. The system proceeds to block 2053.

In block 2053, the eNB 2010 transmits a discovery setup message 2043 to the transmitting mobile station 2020 ($U_T$) and transmits a discovery set up message 2043 to the receiving mobile station 2030 ($U_R$). The system proceeds to block 2054.

In block 2054, the mobile stations 2020 and 2030 engaged in the user initiated device discovery process 2050 with each other communicate 2044 with each other using a D2D discovery protocol. The system proceeds to block 2055.

In block 2055, the transmitting mobile station 2020 ($U_T$) transmits a discovery report 2045 to the eNB 2010, and mobile station 2030 ($U_R$) transmits a discovery report 2045 to the eNB 2010. The discovery reports 2045 indicate a status to the eNB 2010 of whether the mobile stations 2020 and 2030 are engaged in D2D communication.

In this method 2050, location information is not used in assignment of device ID. Even if location information was available at the devices from GPS or from uplink PRS signal, the location information is not used in assigning the device ID for a D2D network with user initiated device discovery. This is because, as devices initiate device discovery on a per need basis instead of all devices attempting to perform device discovery in a time-frequency window 1000, the probability of missed or incorrect detection due to overlap of discovery signals is very small. The unique IDs of the devices is used in device ID allocation instead of location information to overcome uncertainties arising from devices having same C-RNTI and from there being insufficient physical cell IDs (in small cell networks).

Third Embodiment

Network Assisted Device ID Assignment with Only PCI and C-RNTI Information

Certain embodiments (denoted as "Embodiment three") include a method of device ID assignment in network assisted D2D networks, such as network 400, where the devices are assumed to be in network coverage. Only PCI and C-RNTI ID are used in determining the device IDs of devices in the D2D network. Location information and UE-ID information are not used for device ID assignment in the D2D networks according to the embodiment three. Accordingly, set of parameters used by the specific D2D network of embodiment three is as follows:

$$P_{d2d} = \{PCI, C\text{-}RNTI\}$$

By assumption, all the devices in the D2D network have access to PCI, C-RNTI ID (by assumption), accordingly no initialization bits are used in the device ID assignment. In one method of device ID assignment, the total L bits is divided into 2 groups of bits of size $L_{3,1}^{pci}$ and $L_{3,1}^{crnti}$ to represent the PCI and C-RNTI information respectively. The device ID assignment from the PCI and C-RNTI follows the same procedure as the one used in embodiment one.

Figure 21:
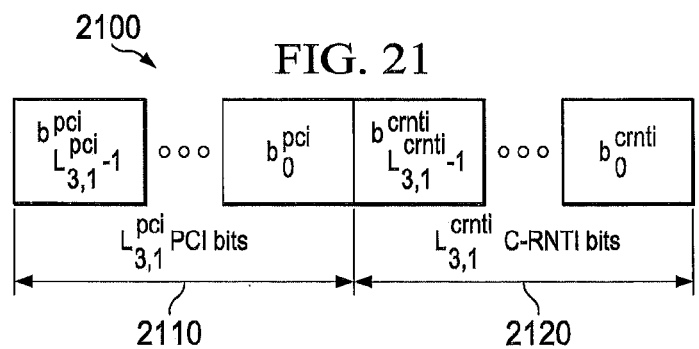
FIG. 21 illustrates a structure of a device ID in a Network Assisted D2D Network with only network parameters according to embodiments of the present disclosure.

FIG. 21 illustrates a structure of a device ID in a Network Assisted D2D Network with only network parameters (PCI and C-RNTI) and with no initialization bits, no location information, and no unique UE-ID information according to embodiments of the present disclosure. The device ID structure 2100 in FIG. 21 is for illustration only. Other embodiments could be used without departing from the scope of this disclosure. The device ID structure 2100 includes a set of PCI bits 2110, followed by a set of C-RNTI bits 2120. The bits used in the device ID are generated as follows:

$$\left(b_{L_{3,1}^{pci}-1}^{pci}, \ldots, b_0^{pci}\right) = f_{3,1}^{pci}(PCI), \quad (28)$$

$$\left(b_{L_{3,1}^{crnti}-1}^{crnti}, \ldots, b_0^{crnti}\right) = f_{3,1}^{crnti}(C-RNTI). \quad (29)$$

Table 7 shows different combinations of the total number of bits (L) used for the device ID and the number of bits assigned to each parameter.

TABLE 7

Number of Bits used in Device ID Assignment for Network Assisted D2D Network

| Device ID Assignment Scheme | Total number of bits | Number of PCI bits | Number of C-RNTI bits |
|---|---|---|---|
| 1 | 25 | 9 | 16 |
| 2 | 24 | 8 | 16 |
| 3 | 20 | 8 | 12 |
| 4 | 16 | 8 | 8 |
| 5 | 16 | 6 | 10 |

As the device ID is made of only PCI and C-RNTI IDs, it is easier to implement the baseline bit assignment of using the full PCI and C-RNTI information in the device ID. Also, Table 7 includes alternative bit assignments in addition to baseline bit assignments.

The device ID assignment method of this embodiment can be used in large cell networks where the chances of D2D communications across several cells are small. In large cells networks, the C-RNTI ID of the devices is used to distinguish between mobile devices within a cell. To distinguish mobile devices in different cells, the cell identifier given by PCI can be used as a distinction.

Fourth Embodiment

Network Assisted Device ID Assignment Using Location Information Based on Neighboring Strongest Cell PCIs In certain embodiments (denoted as "Embodiment four"), the mobile device stores a neighbor cell list for mobility management purposes. The neighbor cell list contains the PCIs obtained from neighboring cell measurements as well as the received signal power strength or quality from the respective neighboring cells. As a technical advantage, the neighbor cell list information can be used in device ID assignment as a proxy for relative device location information. For example, two mobile devices served by the same cell (i.e., same serving eNB) will have the same serving cell PCI, but the neighbor list within each of the two mobile devices may contain different PCI values for the next two strongest cells if the mobile devices are at different locations in the serving cell. The neighboring PCI values can be used to further differentiate the device IDs than if only the serving cell PCI was utilized.

The following example will be used to explain the different examples described below: UE1 (such as mobile device 114) and UE2 (such as mobile device 116) are both served by eNB1 (such as eNB 102) with $PCI=PCI_1=100100100$. UE1 has a strongest neighbor cell with $PCI=PCI_2=110011001$ and a second strongest neighbor cell with $PCI=PCI_3=111010011$. UE2 has a strongest neighbor cell with $PCI=PCI_4=100100001$ and a second strongest neighbor cell with $PCI=PCI_3$. In this example considered, k least significant bits of a PCI are used to represent the PCI using k bits.

Table 8 shows various methods (or schemes) of using PCI values of neighboring cells in the device ID assignment. For example, in the schemes 1a and 1b, the bits reserved for PCI information in the device ID is partitioned to include both the PCI of the serving cell and at least one of K (i.e., K equals the number of neighboring cells) PCI values of neighboring cells. In schemes 2a and 2b, the bits reserved for PCI information in the device ID is partitioned to include PCI information of at least one of K PCI values of neighboring cells, but no bits are reserved for PCI information of the serving cell.

TABLE 8

Different PCI Representations in Device ID

| | UE1 | | | UE2 | | |
|---|---|---|---|---|---|---|
| Scheme | Serving $PCI_1$ | Neighbor 1 $PCI_2$ | Neighbor 2 $PCI_3$ | Serving $PCI_1$ | Neighbor 1 $PCI_4$ | Neighbor 2 $PCI_3$ |
| 1a | 00100 | 1001 | — | 00100 | 0001 | — |
| 1b | 100 | 001 | 011 | 100100 | 001 | — |
| 2a | — | 11001 | 0011 | — | 00001 | 0011 |
| 2b | — | 011001 | 011 | — | 100100001 | — |

In scheme 1a, the number of bits reserved for each PCI value can be equal and fixed. That is, K=1. PCI bits are partitioned such that 5 bits are allocated to represent the serving cell PCI and 4 bits are allocated to represent the neighbor cell #1. No bits are allocated for neighbor cell #2.

In scheme 1b, the number of bits reserved for each PCI value is configurable. This configurability may be beneficial in the case where two UEs have the same neighbor cell lists but the eNB implements a process to differentiate the device IDs corresponding to the two UEs. For example, for UE1, K=2 neighboring cells. PCI bits are partitioned such that 3 bits are allocated to represent serving cell PCI; 3 bits are allocated to represent neighbor cell #1; and 3 bits are allocated to represent neighbor cell 2. For UE2, K=1 neighboring cell. PCI bits are partitioned such that 6 bits are allocated to represent the serving cell PCI; and 3 bits are allocated to represent the neighbor cell #1.

In scheme 2a and 2b, the bits reserved for PCI information in the device ID is partitioned to include at least K PCI values of neighboring cells. In the scheme 2a, the number of bits reserved for each PCI value are equal and fixed. For example, K=2 neighboring cells. PCI bits are partitioned such that 5 bits are allocated to represent neighbor cell #1 PCI and 4 bits are allocated to represent neighbor cell #2.

In scheme 2b, the number of bits reserved for each PCI value are configurable. For example, for UE1, K=2 neighboring cells. PCI bits are partitioned such that 6 bits are allocated to represent the PCI of neighbor cell #1 and 3 bits are allocated to represent the PCI of neighbor cell #2. For UE2 K=1 neighboring cells. PCI bits are partitioned such that 9 bits are allocated to represent the PCI of neighbor cell #1.

Fifth Embodiment

Device ID Assignment in Ad-Hoc D2D Networks with No eNB Assistance (Using GPS Location Information)

Certain embodiments (denoted as "Embodiment five") include a method of assigning device IDs for mobile devices, such as mobile device 520, in D2D networks where the network eNB does not assist the mobile devices set up device discovery or D2D communication links. In embodiment five, devices perform D2D communications in an ad-hoc manner. A mobile station 520 implements a process of device ID assignment in D2D networks where the eNB network related parameters such as PCI, C-RNTI and PRS location information are not used in the device ID assignment, as described more particularly below. The mobile station implementing the process only uses GPS location information and the unique UE ID information of the device in determining the device ID. Accordingly, set of parameters used by the specific D2D network of embodiment five is as follows:

$P_{d2d}$={GPS,UE-ID}.

As the GPS location information may not be available to all devices, the GPS location information is an optional parameter that may or may not be used in the device ID assignment. As a result, a single initialization bit indicates whether the GPS location information is used in the device ID assignment. The indicator bit is set to 1 if GPS location information is used and is set to zero if GPS location information is not used.

FIGS. 22 and 23 illustrate device ID structures in an ad-hoc D2D network with GPS Location information according to embodiments of the present disclosure. The device ID structures 2200 and 2300 in FIGS. 22 and 23 are for illustration only. Other embodiments could be used without departing from the scope of this disclosure. The device ID structures 2200 and 2300 include one initialization bit 2210, 2310 followed by a group of identifier bits 1120.

In FIG. 22, the initialization bit 2210 has as value of 1 to specify that the process of generating the device ID uses GPS location information and that the identifier bits 1120 in the device ID includes GPS bits. The device ID structure 2200 includes the single initialization bit 2210 followed by a set of GPS bits 2220, and a set of UE-ID bits 2230.

The representation of the GPS location and UE-ID information in the device ID is described in detail in embodiment one and is not repeated here. For mobile devices that use both GPS location information and unique UE-ID in generating a device ID assignment, the bits used for different parameters in the device ID are determined according to Equations 30 and 31

$$\left(b_{L_{4,1}^{gps}-1}^{gps}, \ldots, b_0^{gps}\right) = f_{4,1}^{gps}(GPS), \quad (30)$$

$$\left(b_{L_{4,1}^{ue-id}-1}^{ue-id}, \ldots, b_0^{ue-id}\right) = f_{4,1}^{ue-id}(UE-ID). \quad (31)$$

In FIG. 23, the initialization bit 2310 has as value of 0 to specify that the process of generating the device ID does not use GPS location information and that the identifier bits 1120 in the device ID do not include GPS bits. The device ID structure 2300 includes the single initialization bit 2310 followed by a set of UE-ID bits 2320. The set of UE-ID bits 2320 is the entirety of the group identifier bits 1120. For mobile devices that use only unique UE-ID in device ID assignment, the bits used to represent the unique UE-ID are given by $$\left(b_{L_{4,0}^{ue-id}-1}^{ue-id}, \ldots, b_0^{ue-id}\right) = f_{4,0}^{ue-id}(UE-ID). \quad (32)$$

Table 9 shows that different combinations of the total number of bits (L) in the device ID and the number of bits assigned to each parameter.

TABLE 9

Number of Bits Assigned to Device ID in Ad-Hoc Networks with GPS Location

| Device ID Assignment Scheme | Using GPS Location Information | | | Using no Location Information | |
|---|---|---|---|---|---|
| | Number of bits (L) | Number of GPS location bits | Number of UE-ID bits | Number of bits | Number of UE-ID bits |
| 1 | 32 | 15 | 16 | 32 | 31 |
| 2 | 24 | 11 | 12 | 24 | 23 |
| 3 | 16 | 7 | 8 | 16 | 15 |

Sixth Embodiment

Device ID Assignment in Ad-Hoc D2D Networks with No eNB Assistance (Using No GPS Location Information)

Certain embodiments (denoted as "Embodiment six") include a method of assigning device IDs to mobile stations in D2D networks where the network eNB does not assist the mobile devices in setting up device discovery or D2D communication links. The mobile devices 520 perform D2D communications in an ad-hoc manner. In this embodiment, the mobile device 520 assigns a device ID in D2D networks where the eNB network related parameters such as PCI, C-RNTI and PRS location information are not used in the device ID assignment. In embodiment six, the devices may not have access to GPS location information, and GPS location information is not used in the device ID assignment. The device ID is assigned using only the unique UE-ID. Accordingly, set of parameters used by the specific D2D network of embodiment six is as follows:

$P_{d2d} = \{\text{UE-ID}\}$.

FIG. 24 illustrates a device ID structure in an ad-hoc D2D network with no GPS location information according to embodiments of the present disclosure. The device ID structure includes a set of UE-ID bits, and no initialization bit are used in the device ID assignment. The device ID structure 2400 in FIG. 24 is for illustration only. Other embodiments could be used without departing from the scope of this disclosure. The mapping of the UE-ID information to the device ID is described above in reference to embodiment one. The bits used to represent the UE Unique-ID information are determined according to Equation 33

$$\left( b^{ue-id}_{L^{ue-id}_{6,1}-1}, \ldots, b^{ue-id}_0 \right) = f^{ue-id}_{6,1}(UE - ID). \quad (33)$$

The mobile station 520 implementing the method of assigning a device ID in an ad-hoc D2D network with no GPS location information uses only one parameter in assigning the device ID. The mobile device 520 uses more bits in representing the one parameter (namely, the device ID information parameter) because the total number ($l_2 = L - l_1$) of identifier bits 1125 is not divided among multiple parameters. For example, the mobile device can allocate 16, 24, 32 or 48 bits to represent the UE-ID information.

Seventh Embodiment

Device ID Assignment in Hybrid D2D Networks with Location Information

FIG. 25 illustrates two neighboring physical cells and eNBs and the mobile stations within each physical cell according to embodiments of the present disclosure. The eNBs and the mobile stations within neighboring physical cells 2505 and 2515 implement a method of assigning device IDs in hybrid D2D networks, where some devices (such as MS 620) are in-network range and can receive assistance from eNB in the setting up of D2D communication links, while other mobile devices (such as MS 520) may be outside network range and may have to initiate ad-hoc D2D communications by themselves. The neighboring physical cells 2505 and 2515 shown in FIG. 25 are for illustration only. Other embodiments could be used without departing from the scope of this disclosure.

The eNB 2510 (eNB1) establishes the physical cell 2505 within the coverage area of the eNB 2510 (eNB1). The physical cell 2505 includes the in-network mobile devices A 420*a* and B 420*b* which are in range of eNB1 2510. The eNB1 2510 communicates with the device pair (i.e., mobile devices 420*a-b*) in setting up the D2D communication link between the two mobile devices 420*a-b*. The physical cell 2505 also includes mobile device C 520*c* and mobile device D 520*d*, which are out of range of both eNB1 2510 and eNB2 2520. The mobile device C 520*c* and mobile device D 520*d* establish D2D communication between themselves with no network assistance, such as an ad-hoc D2D communication link 2530. The mobile devices 520*c* and 520*d* transmit and receive send control, discovery, and data signals 530 amongst each other via the ad-hoc D2D communication link 2530.

The eNB 2520 (eNB2) establishes the physical cell 2515 within the coverage area of the eNB2 2520. The physical cell 2515 includes the in-network mobile devices E 420*e* and F 420*f* that are in range of eNB2 2520. The eNB2 2520 communicates with the device pair (i.e., mobile devices 420*e-f*) in setting up the D2D communication link between the two mobile devices 420*e-f*. The physical cell 2515 also includes in-network mobile device G 620*g* and out-of-range mobile device H 630*h*. That is, mobile device 620*g* (G) is in network range and mobile device 630*h* (H) is outside the range of eNB2 2520. In this example, mobile device 620*g* (G) can communicate with eNB2 2520, but eNB2 2520 may not be able to provide full assistance in setting up a D2D communication link between mobile devices 620*g* (G) and mobile device 630*h* (H).

The set of parameters used by the specific D2D network of embodiment seven includes 5 parameters in the parameter set as shown below:

$P_{d2d} = \{\text{PCI,C-RNTI,PRS,GPS,UE-ID}\}$.

All of the mobile devices have guaranteed access to only one parameter—unique UE-ID. The other parameters (i.e., PCI, C-RNTI, PRS, and GPS) may or may not be available depending on device type and location. If the mobile device is located in range of an eNB, the device has access to network parameters PCI, C-RNTI and PRS. Similarly, if the device has access to GPS location service, then the mobile device has GPS location information that can be used in generating the device ID assignment. In the device assignment for D2D networks in embodiment seven, 4 indicator bits indicate the usage or non-usage of the parameters PCI, C-RNTI, PRS and GPS location information.

FIGS. 26 and 27 illustrate a device ID structure for hybrid D2D networks corresponding to examples of configurations according to embodiments of the present disclosure. FIG. 26 illustrates an example of configuration 15 (i.e., j=15), and FIG. 27 illustrates an example of configuration 1 (i.e., j=1). The device ID structures 2600 and 2700 in FIGS. 26 and 27 are for illustration only. Other embodiments could be used without departing from the scope of this disclosure. The device ID structures 2600 and 2700 include four initialization bits 2610 followed by a group of identifier bits 1120.

The mapping of the parameters to the device ID bits is described more particularly above in the description of embodiment one. FIGS. 26 and 27 show two examples of configurations for J–1 and j=15. Embodiments of this disclosure include several possible device ID assignment configurations based on the exact parameters used in the determination of the device ID. For example, the 4 indicator bits 2610 can represent a maximum of 16 configurations of device ID assignments. If all the parameters are used in the device ID assignment, the indicator bits set to (1,1,1,1) and the parameter configuration number is set to 15. For parameter configuration number j, the function for mapping parameter p to $L_{6,j}^P$ bits is given by Equation 34

$$\left(b_{L_{7,j}^p-1}^p, \dots, b_0^p\right) = f_{7,j}^p(P). \quad (34)$$

In FIG. 26, the initialization bits 2610 include four bit values of 1, which is the binary representation of the configuration number j=15. Also, the four bit values of 1 indicate the usage of the parameters of PCI, C-RNTI, PRS and GPS location information. As a result, the identifier bits 1120 include a set of PCI bits 2620, a set of C-RNTI bits 2630, a set of PRS bits 2640, and a set of GPS bits 2650. The identifier bits 1120 include further include UE-ID bits 2660 corresponding the unique UE-ID parameter.

In FIG. 27, the initialization bits 2610 include values of 0-0-0-1, which is the binary representation of the configuration number j=1. Also, the bit values of 0-0-0-1 indicate the non-usage of the parameters of PCI, C-RNTI, PRS and the usage of the parameter of GPS location information. As a result, the identifier bits 1120 include a set of GPS bits 2720. The identifier bits 1120 include further include UE-ID bits 2730 corresponding the unique UE-ID parameter.

In a hybrid D2D network there must be a way to distinguish between in-network and out-of-network states for devices. An example solution is to determine that a mobile device is out-of-network if the mobile device encounters a radio link failure. Another example solution is to define an idle mode out-of-network state where a mobile device can participate in idle mode D2D discovery or communications. For example, the mobile device can configure D2D discovery parameters even while in the RRC_IDLE state. The device IDs can be configured by different methods depending on whether the devices are in-network or out-of-network coverage.

Eighth Embodiment

Device ID Assignment Using No Indicator Bits

Certain embodiments (denoted as "Embodiment eight") include a device ID assignment process that does use indicator bits in the device ID to indicate the parameters used in the device ID assignment. The use of indicator bits help in determining the parameters used in device ID assignment. However, in certain scenarios, information about the parameters used in the device ID assignment may not be necessary. For example, receiving mobile devices in a D2D network can identify transmitting mobile devices by the discovery transmission pattern corresponding to the device ID. That is, mobile devices that have different device IDs also have different transmission patterns. In certain scenarios of determining the device IDs of a transmitting mobile device, it is not necessary to know the exact details of how the device ID of the transmitting mobile device is configured.

When using multiple parameters (for example, 4 or 5 parameters) in configuring device IDs, using bits to show the exact parameters used can be inefficient, especially when the number of bits used for device ID assignment is restricted or otherwise limited. For example, if a restriction requires that not more than 16 bits can be used in the device ID, and there are 4 parameters in $P_{d2d}$, and all possible parameter configurations are possible in device ID assignment (as in hybrid D2D networks), then 4 indicator bits out of the 16 possible bits are used to indicate the parameters used in device ID assignment. A better representation of the parameters in the device ID can be provided by using the 4 bits to represent the parameters in more detail. For devices that use the same parameters for device ID assignment, the use of indicator bits to better represent the parameters can lead to better differentiation of the devices, leading to fewer device ID collisions.

FIG. 28 illustrates an example of a device ID collision caused by having an insufficient number of parameters according to embodiments of the present disclosure. Each of the mobile devices A 2810 and B 2820 use PCI, C-RNTI, GPS location information and unique UE-ID in the process of assigning its device ID. In this example, the eNB 2825 establishes a physical cell 2800 that includes a hybrid D2D network. Accordingly, set of parameters used by the specific D2D network of embodiment eight is as follows:

$$P_{d2d} = \{PCI, C\text{-}RNTI, GPS, UE\text{-}ID\}.$$

The mobile device 2810 (A) and mobile device 2820 (B) each use 4 indicator bits and use the same set of parameters in their device ID assignments, which means that the 4 indicator bits are the same for both the devices 2810 and 2820. In this example, 2 bits are used for PCI, 4 bits are used for C-RNTI, 3 bits for GPS, and 3 bits for UE-ID. A different allocation of bits to represent each parameter can be used without departing from the present disclosure. The mobile devices 2810 and 2820 (A and B) have the same device ID 2830 with indicator bits. However, in the process of assigning a device ID, when the indicator bits are removed, and instead, 3 bits for PCI, 5 bits for C-RNTI, 3 for GPS and 5 for UE-ID are used, the device ID 2840 of mobile device 2810 (A) is different from the device ID 2845 mobile device 2820 (B) in 4 bit places.

In a D2D device assignment scheme where a constant number of bits are used for the device ID irrespective of the parameters used, and where the same number of bits are used to represent each parameter, a default bit sequence is used for parameters that are not used in the device ID assignment. In this scenario, using indicator bits to represent the parameters used is not necessary as the absence of parameters can be deduced by the use of the default bit sequence.

Advantages and disadvantages of not using indicator bits in the device ID are described below. Advantages of not using indicator bits in the device ID include:
1 Providing extra bits to represent parameters.
2 Saving on redundancy when the total number of bits and the number of bits for each parameter are fixed.
3 Reducing device ID collision for devices that use similar parameters in representing device ID (examples of which are shown in FIG. 28).
4 Important information about devices can be provided using fewer indicator bits. For example, in FIG. 28, 4 indicator bits represent the use of 4 parameters. However, if the only information that is necessary is whether the device is in network or out of network, this information could be provided by 1 bit.

Disadvantages of not using indicator bits in the device ID include:
1. No information on the parameters used to form the device ID (for example, difficulty to distinguish between in network and out of network devices in hybrid D2D networks).
2. Occasional device ID collision when two devices use different parameters in device ID assignment. It is to be noted that the probability of such device ID collisions are however lower than the gains we get by better parameter representation.
3. The use of indicator bits can allow for flexibility in device ID ranges. That is, indicator bits can be used to specify variations in device ID sizes. For example, we can use configuration 0000 to indicate that the device ID is 15 bits in size, and configuration 1111 may represent device IDs which are 30 bits.

In this disclosure, different device ID assignment methods are described for three different classes of D2D networks—eNB assisted D2D network, ad-hoc D2D network with no eNB assistance and hybrid D2D networks.

Although the present disclosure has been described with embodiment, various changes and modifications may be suggested to one skilled in the art. It is intended that the present disclosure encompass such changes and modifications as fall within the scope of the appended claims.

What is claimed is:

1. A method of assigning a device identification (ID) of a device-to-device (D2D) network to a mobile station, the method comprising:
   selecting a subset from a set of parameters from which the device ID is determined, each parameter in the set having a number of bits for complete representation, the subset comprising a number $N_{d2d}$ of parameters used to determine the device ID;
   determining a number L of device ID bits to represent the device ID;
   dividing the L device ID bits into a group of $l_1$ indicator bits and a group of $l_2$ identifier bits, wherein $l_2$ is the difference between the number L of device ID bits and the number $l_1$ of bits allocated to the group of indicator bits;
   assigning bit values to the $l_1$ indicator bits;
   allocating a number $L_j^p$ of the $l_2$ identifier bits to each of the parameters in the subset, wherein j denotes a parameter combination number, and p denotes the parameter; and
   assigning bit values for the $l_2$ identifier bits according to one or more functions.

2. The method of claim 1, further comprising selecting the parameters in the subset of parameters from the set of parameters including:
   network configured parameters,
   location information parameters, and
   a unique user equipment ID.

3. The method of claim 1, wherein a binary value of the group of $l_1$ indicator bits is mapped to a corresponding subset of parameters.

4. The method of claim 1, wherein each bit in the group of $l_1$ indicator bits indicates a presence of one or more corresponding parameters in the subset of parameters.

5. The method of claim 1, wherein the one or more functions comprise one of:
   a one-to-one mapping function, and
   a many-to-one mapping function.

6. The method of claim 1, wherein the one or more functions comprise a function corresponding to each of the parameters in the subset of parameters, and
   wherein the one or more functions includes a function corresponding to a parameter, the function converts the complete binary representation of the parameter to a reduced binary representation having fewer bits than the complete binary representation, the fewer bits being the number $L_j^p$ of the $l_2$ identifier bits allocated to the parameter.

7. The method of claim 1, further comprising: mapping the device ID to a transmission pattern.

8. The method of claim 1, further comprising:
   receiving a device ID consisting of a first set of $l_1$ indicator bits and a second set of $l_2$ identifier bits, where the $l_2$ identifier bits are mapped to one or more configured parameters based on the first set of $l_1$ indicator bits.

9. The method of claim 8, further comprising:
   generating a device ID based on previously received device ID values and configurations of other transmitting mobile stations.

10. The eNB of claim 9, further configured to:
    in response to receiving an indication that the mobile station seeks to discover another mobile station for D2D communication, set up generation of a device ID of the mobile station.

11. A base station (eNB) for assigning a device identification (ID) of a device-to-device (D2D) network to a mobile station, the eNB comprising:
    processing circuitry configured to:
    select a subset from a set of parameters from which the device ID is determined, each parameter in the set having a number of bits for complete representation, the subset comprising a number $N_{d2d}$ of parameters used to determine the device ID;
    determine a number L of device ID bits to represent the device ID;
    divide the L device ID bits into a group of $l_1$ indicator bits and a group of $l_2$ identifier bits, wherein $l_2$ is the difference between the number L of device ID bits and the number $l_1$ of bits allocated to the group of indicator bits;
    assign bit values to the $l_1$ indicator bits;
    allocate a number $L_j^p$ of the $l_2$ identifier bits to each of the parameters in the subset, wherein j denotes a parameter combination number, and p denotes the parameter; and
    assign bit values the $l_2$ identifier bits according to one or more functions.

12. The eNB of claim 11, further configured to select the parameters in the subset of parameters from the set of parameters including:
    network configured parameters,
    location information parameters, and
    a unique user equipment ID.

13. The eNB of claim 11, further configured to map a binary value of the group of $l_1$ indicator bits is to a corresponding subset of parameters.

14. The eNB of claim 11, wherein each bit in the group of $l_1$ indicator bits indicates a presence of one or more corresponding parameters in the subset of parameters.

15. The eNB of claim 11, wherein the one or more functions comprise one of:
    a one-to-one mapping function, and
    a many-to-one mapping function.

16. The eNB of claim 11, wherein the one or more functions comprise a function corresponding each of the parameters in the subset of parameters, and
    wherein the one or more functions includes a function corresponding to a parameter, the function converts the complete binary representation of the parameter to reduced binary representation having fewer bits than the complete binary representation, the fewer bits being the number $L_j^p$ of the $l_2$ identifier bits allocated to the parameter.

17. The eNB of claim 11, further configured to: map the device ID to a transmission pattern.

18. A mobile station for assigning a device identification (ID) of a device-to-device (D2D) network, the mobile station comprising:
processing circuitry configured to:
select a subset from a set of parameters from which the device ID is determined, each parameter in the set having a number of bits for complete representation, the subset comprising a number $N_{d2d}$ of parameters used to determine the device ID;
determine a number L of device ID bits to represent the device ID;
divide the L device ID bits into a group of $l_1$ indicator bits and a group of $l_2$ identifier bits, wherein $l_2$ is the difference between the number L of device ID bits and the number $l_1$ of bits allocated to the group of indicator bits;
assign bit values to the $l_1$ indicator bits;
allocate a number $L_j^p$ of the $l_2$ identifier bits to each of the parameters in the subset, wherein j denotes a parameter combination number, and p denotes the parameter; and
assign bit values the $l_2$ identifier bits according to one or more functions.

19. The mobile station of claim 18, wherein a binary value of the group of $l_1$ indicator bits is mapped to a corresponding subset ($P_{d2d}$) of parameters.

20. The mobile station of claim 18, further configured to indicate a presence of a parameter in the subset by a corresponding value of each bit in the group of $l_1$ indicator bits.

21. The mobile station of claim 18, wherein the one or more functions comprise one of:
a one-to-one mapping function, and
a many-to-one mapping function.

22. The mobile station of claim 18, wherein the one or more functions comprise a function corresponding each of the parameters in the subset of parameters, and
wherein the one or more functions includes a function corresponding to a parameter, the function converts the complete binary representation of the parameter to reduced binary representation having fewer bits than the complete binary representation, the fewer bits being the number $L_j^p$ of the $l_2$ identifier bits allocated to the parameter.

23. The mobile station of claim 18, further configured to:
receive a device ID consisting of a first set of $l_1$ indicator bits and a second set of $l_2$ identifier bits, where the $l_2$ identifier bits are mapped to one or more configured parameters based on the first set of $l_1$ indicator bits.

24. The mobile station of claim 23, further configured to:
generate a device ID based on previously received device ID values and configurations of other transmitting mobile stations.

* * * * *